United States Patent
Goldenberg et al.

(10) Patent No.: US 12,443,099 B2
(45) Date of Patent: *Oct. 14, 2025

(54) LARGE APERTURE CONTINUOUS ZOOM FOLDED TELE CAMERAS

(71) Applicant: Corephotonics Ltd., Tel Aviv (IL)

(72) Inventors: Ephraim Goldenberg, Tel Aviv (IL); Nadav Goulinski, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,770

(22) Filed: Dec. 23, 2024

(65) Prior Publication Data

US 2025/0123549 A1  Apr. 17, 2025

Related U.S. Application Data

(63) Continuation of application No. 18/661,967, filed on May 13, 2024, now Pat. No. 12,210,278, which is a (Continued)

(51) Int. Cl.
  *G03B 30/00* (2021.01)
  *G03B 17/17* (2021.01)
(52) U.S. Cl.
  CPC .............. *G03B 30/00* (2021.01); *G03B 17/17* (2013.01)
(58) Field of Classification Search
  CPC ........ G03B 30/00; G03B 17/17; G03B 23/02; G02B 15/142; G02B 15/14; G02B 13/10; G02B 13/08; G02B 13/02
(Continued)

(56) References Cited

U.S. PATENT DOCUMENTS

| | | |
|---|---|---|
| 2,106,752 A | 2/1938 | Land |
| 2,354,503 A | 7/1944 | Arthur |
| | (Continued) | |

FOREIGN PATENT DOCUMENTS

| | | |
|---|---|---|
| CN | 101025470 A | 8/2007 |
| CN | 101634738 A | 1/2010 |
| | (Continued) | |

OTHER PUBLICATIONS

Office Action in related CN patent application 202280008147.8, dated Nov. 15, 2024.
(Continued)

*Primary Examiner* — Travis S Fissel
(74) *Attorney, Agent, or Firm* — Nathan & Associates; Menachem Nathan

(57) ABSTRACT

Folded digital cameras comprising a lens including a plurality of N lens elements marked $L_i$ where $1 \leq i \leq N$ and an optical path folding element (OPFE), wherein a first lens element $L_1$ faces an object side and a last lens element $L_N$ faces an image side, wherein at least one of the plurality of lens elements is located at an object side of the OPFE and has an associated first optical axis, wherein at least one other of the plurality of lens elements is located at an image side of the OPFE and has an associated second optical axis, wherein the lens has an effective focal length (EFL) and a f-number (f/#), and an image sensor having a sensor diagonal (SD), wherein the EFL can be varied continuously between a minimal $EFL_{MIN}$ and a maximum $EFL_{MAX}$ by independent movement of lens elements and of the OPFE along the second optical lens axis, and wherein $EFL_{MAX}/EFL_{MIN} > 1.5$.

19 Claims, 10 Drawing Sheets

Related U.S. Application Data continuation of application No. 18/257,592, filed as application No. PCT/IB2022/057189 on Aug. 3, 2022, now Pat. No. 12,019,363.

(60) Provisional application No. 63/247,336, filed on Sep. 23, 2021.

(58) Field of Classification Search
USPC .................................. 359/351, 817, 733
See application file for complete search history.

(56) References Cited

U.S. PATENT DOCUMENTS

| | | | |
|---|---|---|---|
| 2,378,170 A | 6/1945 | Aklin | |
| 2,441,093 A | 5/1948 | Aklin | |
| 3,388,956 A | 6/1968 | Eggert et al. | |
| 3,524,700 A | 8/1970 | Eggert et al. | |
| 3,558,218 A | 1/1971 | Grey | |
| 3,864,027 A | 2/1975 | Harada | |
| 3,942,876 A | 3/1976 | Betensky | |
| 4,134,645 A | 1/1979 | Sugiyama et al. | |
| 4,338,001 A | 7/1982 | Matsui | |
| 4,465,345 A | 8/1984 | Yazawa | |
| 4,792,822 A | 12/1988 | Akiyama et al. | |
| 5,000,551 A | 3/1991 | Shibayama | |
| 5,327,291 A | 7/1994 | Baker et al. | |
| 5,331,465 A | 7/1994 | Miyano | |
| 5,600,488 A | 2/1997 | Minefuji et al. | |
| 5,969,869 A | 10/1999 | Hirai et al. | |
| 6,014,266 A | 1/2000 | Obama et al. | |
| 6,035,136 A | 3/2000 | Hayashi et al. | |
| 6,147,702 A | 11/2000 | Smith | |
| 6,169,636 B1 | 1/2001 | Kreitzer | |
| 6,654,180 B2 | 11/2003 | Ori | |
| 7,180,542 B2 | 2/2007 | Iwasawa et al. | |
| 7,187,504 B2 | 3/2007 | Horiuchi | |
| 7,206,136 B2 | 4/2007 | Labaziewicz et al. | |
| 7,274,516 B2 | 9/2007 | Kushida et al. | |
| 7,426,084 B2 | 9/2008 | Bito et al. | |
| 7,515,351 B2 | 4/2009 | Chen et al. | |
| 7,564,635 B1 | 7/2009 | Tang | |
| 7,643,225 B1 | 1/2010 | Tsai | |
| 7,660,049 B2 | 2/2010 | Tang | |
| 7,684,128 B2 | 3/2010 | Tang | |
| 7,688,523 B2 | 3/2010 | Sano | |
| 7,692,877 B2 | 4/2010 | Tang et al. | |
| 7,697,220 B2 | 4/2010 | Lyama | |
| 7,738,186 B2 | 6/2010 | Chen et al. | |
| 7,777,972 B1 | 8/2010 | Chen et al. | |
| 7,813,057 B2 | 10/2010 | Lin | |
| 7,821,724 B2 | 10/2010 | Tang et al. | |
| 7,826,149 B2 | 11/2010 | Tang et al. | |
| 7,826,151 B2 | 11/2010 | Tsai | |
| 7,869,142 B2 | 1/2011 | Chen et al. | |
| 7,898,747 B2 | 3/2011 | Tang | |
| 7,916,401 B2 | 3/2011 | Chen et al. | |
| 7,918,398 B2 | 4/2011 | Li et al. | |
| 7,957,075 B2 | 6/2011 | Tang | |
| 7,957,076 B2 | 6/2011 | Tang | |
| 7,957,079 B2 | 6/2011 | Tang | |
| 7,961,406 B2 | 6/2011 | Tang et al. | |
| 8,000,031 B1 | 8/2011 | Tsai | |
| 8,004,777 B2 | 8/2011 | Sano et al. | |
| 8,077,400 B2 | 12/2011 | Tang | |
| 8,149,523 B2 | 4/2012 | Ozaki | |
| 8,218,253 B2 | 7/2012 | Tang | |
| 8,228,622 B2 | 7/2012 | Tang | |
| 8,233,224 B2 | 7/2012 | Chen | |
| 8,253,843 B2 | 8/2012 | Lin | |
| 8,279,537 B2 | 10/2012 | Sato | |
| 8,363,337 B2 | 1/2013 | Tang et al. | |
| 8,395,851 B2 | 3/2013 | Tang et al. | |
| 8,400,717 B2 | 3/2013 | Chen et al. | |
| 8,451,549 B2 | 5/2013 | Yamanaka et al. | |
| 8,503,107 B2 | 8/2013 | Chen et al. | |
| 8,514,502 B2 | 8/2013 | Chen | |
| 8,570,668 B2 | 10/2013 | Takakubo et al. | |
| 8,718,458 B2 | 5/2014 | Okuda | |
| 8,780,465 B2 | 7/2014 | Chae | |
| 8,810,923 B2 | 8/2014 | Shinohara | |
| 8,854,745 B1 | 10/2014 | Chen | |
| 8,928,989 B2 | 1/2015 | Tashiro et al. | |
| 8,958,164 B2 | 2/2015 | Kwon et al. | |
| 9,185,291 B1 | 11/2015 | Shabtay | |
| 9,201,223 B2 | 12/2015 | Ohashi | |
| 9,229,194 B2 | 1/2016 | Yoneyama et al. | |
| 9,235,036 B2 | 1/2016 | Kato et al. | |
| 9,279,957 B2 | 3/2016 | Kanda et al. | |
| 9,438,792 B2 | 9/2016 | Nakada et al. | |
| 9,488,802 B2 | 11/2016 | Chen et al. | |
| 9,568,712 B2 | 2/2017 | Dror et al. | |
| 9,678,310 B2 | 6/2017 | Iwasaki et al. | |
| 9,817,213 B2 | 11/2017 | Mercado | |
| 9,835,834 B2 | 12/2017 | Li et al. | |
| 9,869,846 B1 | 1/2018 | Bone et al. | |
| 10,330,892 B2 | 6/2019 | Hashimoto | |
| 10,948,696 B2 | 3/2021 | Shabtay et al. | |
| 11,202,007 B1 * | 12/2021 | Dhanda ............... | H04N 23/667 |
| 11,340,425 B2 | 5/2022 | Yamazaki et al. | |
| 11,347,016 B2 | 5/2022 | Shabtay et al. | |
| 12,069,371 B2 | 8/2024 | Shabtay et al. | |
| 2002/0118471 A1 | 8/2002 | Imoto | |
| 2003/0048542 A1 | 3/2003 | Enomoto | |
| 2004/0095503 A1 | 5/2004 | Iwasawa et al. | |
| 2005/0041300 A1 | 2/2005 | Oshima et al. | |
| 2005/0062346 A1 | 3/2005 | Sasaki | |
| 2005/0128604 A1 | 6/2005 | Kuba | |
| 2005/0141103 A1 | 6/2005 | Nishina | |
| 2005/0168840 A1 | 8/2005 | Kobayashi et al. | |
| 2005/0270667 A1 | 12/2005 | Gurevich et al. | |
| 2006/0092524 A1 | 5/2006 | Konno | |
| 2006/0238902 A1 | 10/2006 | Nakashima et al. | |
| 2006/0262420 A1 | 11/2006 | Matsumoto et al. | |
| 2006/0275025 A1 | 12/2006 | Labaziewicz et al. | |
| 2007/0114990 A1 | 5/2007 | Godkin | |
| 2007/0183058 A1 | 8/2007 | Bito | |
| 2007/0188884 A1 | 8/2007 | Yoshitsugu et al. | |
| 2007/0229983 A1 | 10/2007 | Saori | |
| 2007/0247726 A1 | 10/2007 | Sudoh | |
| 2007/0253689 A1 | 11/2007 | Nagai et al. | |
| 2008/0056698 A1 | 3/2008 | Lee et al. | |
| 2008/0094730 A1 | 4/2008 | Toma et al. | |
| 2008/0094738 A1 | 4/2008 | Lee | |
| 2008/0117527 A1 | 5/2008 | Nuno et al. | |
| 2008/0273250 A1 | 11/2008 | Nishio | |
| 2008/0291531 A1 | 11/2008 | Heimer | |
| 2008/0304161 A1 | 12/2008 | Souma | |
| 2009/0002839 A1 | 1/2009 | Sato | |
| 2009/0067063 A1 | 3/2009 | Asami et al. | |
| 2009/0122423 A1 | 5/2009 | Park et al. | |
| 2009/0135245 A1 | 5/2009 | Luo et al. | |
| 2009/0141365 A1 | 6/2009 | Jannard et al. | |
| 2009/0147368 A1 | 6/2009 | Oh et al. | |
| 2009/0161228 A1 | 6/2009 | Lee | |
| 2009/0225438 A1 | 9/2009 | Kubota | |
| 2009/0279191 A1 | 11/2009 | Yu | |
| 2009/0303620 A1 | 12/2009 | Abe et al. | |
| 2010/0026878 A1 | 2/2010 | Seo | |
| 2010/0033844 A1 | 2/2010 | Katano | |
| 2010/0060995 A1 | 3/2010 | Yumiki et al. | |
| 2010/0165476 A1 | 7/2010 | Eguchi | |
| 2010/0214664 A1 * | 8/2010 | Chia ................... | G02B 13/004 359/678 |
| 2010/0277813 A1 | 11/2010 | Ito | |
| 2011/0001838 A1 | 1/2011 | Lee | |
| 2011/0032409 A1 | 2/2011 | Rossi et al. | |
| 2011/0080655 A1 | 4/2011 | Mori | |
| 2011/0102667 A1 | 5/2011 | Chua et al. | |
| 2011/0102911 A1 | 5/2011 | Iwasaki | |
| 2011/0115965 A1 | 5/2011 | Engelhardt et al. | |
| 2011/0149119 A1 | 6/2011 | Matsui | |
| 2011/0157430 A1 * | 6/2011 | Hosoya ............... | G02B 13/009 348/E5.055 |
| 2011/0188121 A1 | 8/2011 | Goring et al. | |

(56) References Cited

U.S. PATENT DOCUMENTS

| | | |
|---|---|---|
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2012/0314299 A1 | 12/2012 | Tashiro et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0036112 A1 | 2/2014 | Scarff |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1* | 9/2015 | Mercado .......... G02B 13/002 348/370 |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0195691 A1 | 7/2016 | Bito et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0052350 A1 | 2/2017 | Chen |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0276914 A1 | 9/2017 | Yao et al. |
| 2017/0310952 A1 | 10/2017 | Adomat et al. |
| 2017/0329108 A1 | 11/2017 | Hashimoto et al. |
| 2017/0337703 A1 | 11/2017 | Wu et al. |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1* | 7/2018 | Goldenberg .......... H04N 23/57 |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0026117 A1 | 1/2021 | Yao |
| 2021/0048628 A1 | 2/2021 | Shabtay et al. |
| 2021/0048649 A1 | 2/2021 | Goldenberg et al. |
| 2021/0165192 A1 | 6/2021 | Goldenberg et al. |
| 2021/0263276 A1 | 8/2021 | Huang et al. |
| 2021/0364746 A1 | 11/2021 | Chen |
| 2021/0396974 A1 | 12/2021 | Kuo |
| 2022/0004085 A1 | 1/2022 | Shabtay et al. |
| 2022/0046151 A1 | 2/2022 | Shabtay et al. |
| 2022/0066168 A1 | 3/2022 | Shi |
| 2022/0113511 A1 | 4/2022 | Chen |
| 2022/0206264 A1 | 6/2022 | Rudnick et al. |
| 2022/0232167 A1 | 7/2022 | Shabtay et al. |
| 2023/0080199 A1 | 3/2023 | Eromaki et al. |

FOREIGN PATENT DOCUMENTS

| | | |
|---|---|---|
| CN | 102147519 A | 8/2011 |
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| EP | 2533091 A3 | 12/2012 |
| JP | S54157620 A | 12/1979 |
| JP | S59121015 A | 7/1984 |
| JP | 6165212 A | 4/1986 |
| JP | S6370211 A | 3/1988 |
| JP | H0233117 A | 2/1990 |
| JP | 406059195 A | 3/1994 |
| JP | H06258702 A | 9/1994 |

(56) References Cited

FOREIGN PATENT DOCUMENTS

| | | |
|---|---|---|
| JP | H06347687 A | 12/1994 |
| JP | H07120673 A | 5/1995 |
| JP | H07325246 A | 12/1995 |
| JP | H07333505 A | 12/1995 |
| JP | H08179215 A | 7/1996 |
| JP | H09211326 A | 8/1997 |
| JP | H11223771 A | 8/1999 |
| JP | 2000131610 A | 5/2000 |
| JP | 2000292848 A | 10/2000 |
| JP | 3210242 B2 | 9/2001 |
| JP | 2002365549 A | 12/2002 |
| JP | 2003329932 A | 11/2003 |
| JP | 2004226563 A | 8/2004 |
| JP | 2004247887 A | 9/2004 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2011151448 A | 8/2011 |
| JP | 2012203234 A | 10/2012 |
| JP | 2012230323 A | 11/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019028249 A | 2/2019 |
| JP | 2019113878 A | 7/2019 |
| KR | 20080088477 A | 10/2008 |
| KR | 20090019525 A | 2/2009 |
| KR | 20090131805 A | 12/2009 |
| KR | 20110058094 A | 6/2011 |
| KR | 20110115391 A | 10/2011 |
| KR | 20120068177 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | M602642 U | 10/2020 |
| WO | 2013058111 A1 | 4/2013 |
| WO | 2013063097 A1 | 5/2013 |
| WO | 2018130898 A1 | 7/2018 |

OTHER PUBLICATIONS

A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
Husain Sumra: "Security Camera Field Of View Tips—How ToPosition Your Camera I Ooma", , Aug. 2, 2019 (Aug. 2, 2019), XP093206028, Retrieved from the Internet: URL:https://www.ooma.com/blog/home-security/how-to-positionyour-.
Office Action in related JP patent application, dated Dec. 17, 2024.
Office Action in related EP patent application 22872285.6, dated Mar. 11, 2025.

* cited by examiner

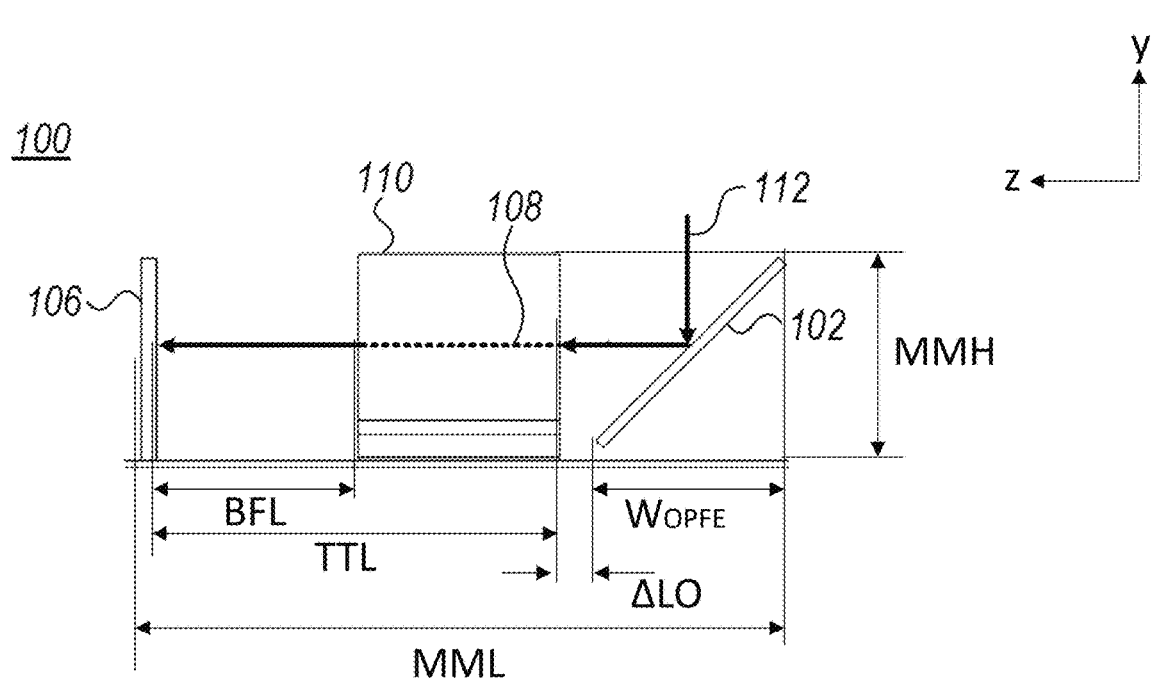
*FIG. 1A   KNOWN ART*
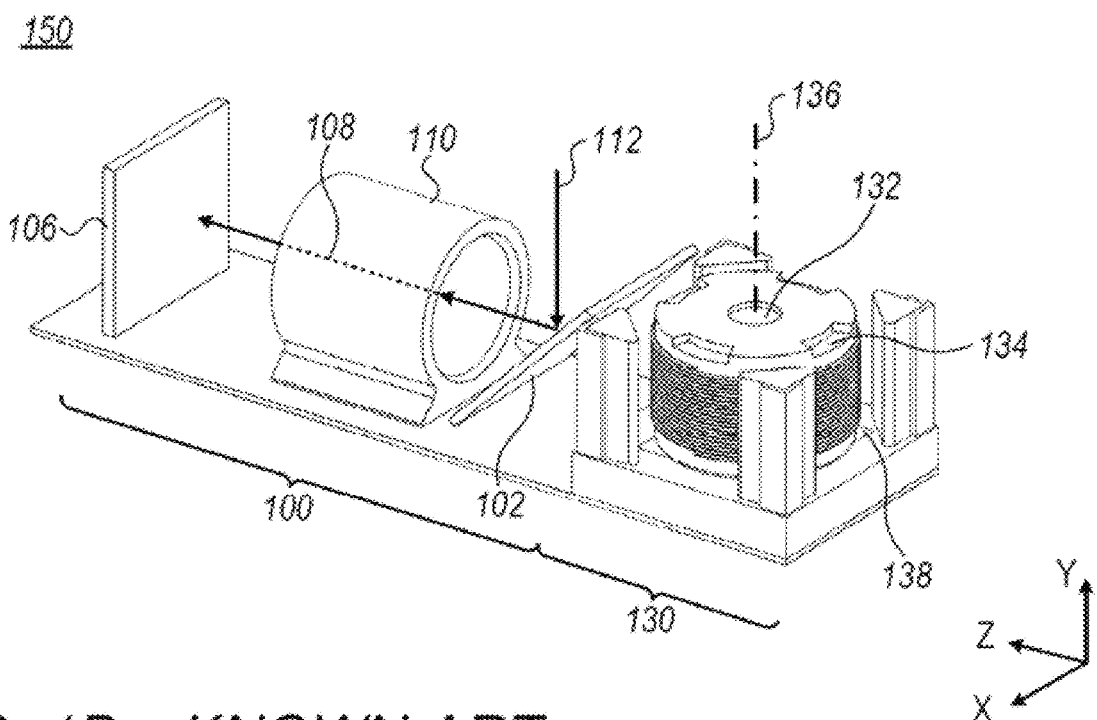
*FIG. 1B   KNOWN ART*

LARGE APERTURE CONTINUOUS ZOOM FOLDED TELE CAMERAS

CROSS REFERENCE TO RELATED APPLICATIONS

This is a continuation of U.S. patent application Ser. No. 18/661,967 filed May 13, 2024 (now allowed), which was a continuation of U.S. patent application Ser. No. 18/257,592 filed Jun. 15, 2023 (now U.S. Pat. No. 12,019,363), which was a 371 application from international patent application PCT/IB2022/057189 filed Aug. 3, 2022, which claims the benefit of priority from U.S. Provisional patent application No. 63/247,336 filed Sep. 23, 2021, which is incorporated herein by reference in its entirety.

FIELD

The presently disclosed subject matter is generally related to the field of digital cameras.

Definitions

In this application and for optical and other properties mentioned throughout the description and figures, the following symbols and abbreviations are used, all for terms known in the art:

Total track length (TTL): the maximal distance, measured along an axis parallel to the optical axis of a lens, between a point of the front surface $S_1$ of a first lens element $L_1$ and an image sensor, when the system is focused to an infinity object distance.

Effective focal length (EFL): in a lens (assembly of lens elements $L_1$ to $L_N$), the distance between a rear principal point P' and a rear focal point F' of the lens.

f-number (f/#): the ratio of the EFL to an entrance pupil diameter.

BACKGROUND

Multi-aperture cameras (or "multi-cameras", of which a "dual-camera" having two cameras is an example) are included in practically all current portable electronic mobile devices ("mobile devices", e.g. smartphones, tablets, etc.). A multi-camera usually comprises a wide field-of-view (or "angle") $FOV_W$ camera ("Wide" camera or "W" camera), and at least one additional camera, e.g. with a narrower (than $FOV_W$) field-of-view (Telephoto or "Tele" camera with $FOV_T$). In general, a spatial resolution of the Tele camera is constant and may e.g. be 3 times or 5 times or 10 times higher than the resolution of the W camera. This is referred to as the Tele camera having a "zoom factor" (ZF) of 3 or 5 or 10 respectively. ZF is determined by the EFL of the Tele camera ($EFL_T$).

As an example, consider a dual camera having a W camera and a Tele camera with ZF of 5. When zooming into a scene, one may use the W camera's image data, which is digitally zoomed up to a ZF of 5. For a ZF≥5 one may use the Tele camera's image data, which is digitally zoomed for ZF>5. In some scenes, a high ZF is desired for capturing images with high resolution. In other scenes, a high ZF is undesired as only (digitally zoomed) Wide camera image data may be available, since $FOV_T$ may be too narrow because of the high ZF. Tele cameras that can provide continuous zoom factors between a minimum ZF, $ZF_{MIN}$, and a maximum ZF, $ZF_{MAX}$, are described for example in co-owned international patent applications Nos. PCT/IB202/061078 and PCT/IB2022/052515.

FIG. 1A illustrates a known folded Tele camera 100 comprising an optical path folding element (OPFE) 102 having a width $W_{OPFE}$, a lens 104 with a plurality of lens elements (not visible in this representation) included in a lens barrel 110 which is located at a distance ΔLO from OPFE 102, and an image sensor 106. OPFE 102 folds an optical path (OP) from a first OP 112 to a second OP 108 that forms the optical axis of lens 104. Lens 104 is located at an image side of OPFE 102. A theoretical lower limit for a length of a camera module ("minimum module length" or "MML") and a height of a camera module ("minimum module height" or "MMH") including camera 100 is shown. MML and MMH are defined by the smallest dimensions of the components included in camera 100. The TTL is given by TTL=MML-$W_{OPFE}$-ΔLO, so TTL is limited geometrically by TTL<MML-$W_{OPFE}$.

FIG. 1B illustrates a known dual-camera 150 that comprises folded Tele camera 100 and a (vertical or "upright") W camera 130 including a lens 132 with a plurality of lens elements (not visible in this representation) and an image sensor 138. Lens 132 is included in a lens barrel 134. W camera 130 has an OP 136.

FIG. 1C shows schematically a known mobile device 160 (e.g. a smartphone) having an exterior rear surface 162 and including a folded Tele camera 100 in a cross-sectional view. The aperture of camera 100 is located at rear surface 162. A front surface 164 of mobile device 160 may include a screen (not visible). Mobile device 160 has a regular region 166 of thickness ("T") and a camera bump region 168 that is elevated by a height B over the regular region. Bump region 168 has a bump length ("BL") and a bump thickness T+B. In general and as shown here, camera 100 is entirely integrated in bump region 168, so that MML and MMH define a lower limit for the dimensions of bump region 168, i.e. for BL and T+B. Vice versa, given dimensions of bump region 168 pose an upper limit for MML and MMH as well as for the included components. In particular, an aperture diameter ("DA") or "entrance pupil" of camera 100 fulfills DA<MMH. For industrial design reasons, a compact camera bump (i.e. a short BL and a small B) is desired. Compared to a vertical camera such as 130 and for a given bump thickness T+B, with a folded camera such as 100 one can realize larger TTL, corresponding to larger ZFs, which is desired. However, a large TTL goes along with a large BL, which is undesired.

It would be beneficial to have a continuous zoom folded Tele camera with an aperture diameter DA that provides even large EFLs at a low f/# and which still occupies a small region of a mobile device's camera bump.

SUMMARY

In various example embodiments, there are provided folded digital cameras, comprising: a lens including a plurality of N lens elements marked $L_i$ where 1≤i≤N and an OPFE, wherein a first lens element $L_1$ faces an object side and a last lens element $L_N$ faces an image side, wherein at least one of the plurality of lens elements is located at an object side of the OPFE and has an associated first optical axis, wherein at least one other of the plurality of lens elements is located at an image side of the OPFE and has an associated second optical axis, wherein the lens has an EFL and a f/#; and an image sensor having a sensor diagonal (SD), wherein the EFL can be varied continuously between a minimal $EFL_{MIN}$ and a maximum $EFL_{MAX}$ by independent movement of lens elements and of the OPFE along the second optical lens axis, and wherein $EFL_{MAX}/EFL_{MIN}>1.5$.

In some examples, the lens is divided into two lens groups numbered G1 and G2 and the continuous variation in EFL is obtained by an independent movement of each of G1 and G2. In some examples, G1 includes three lens element sub-groups G1-1, G1-2, G1-3 and the OPFE, wherein G1-1 is located on the object side of the OPFE and wherein G1-2 and G1-3 are located on the image side of the OPFE. In some examples, G2 includes lens two element sub-groups G2-1 and G2-2, wherein G2-1 is located on the image side of G1-2 and wherein G2-2 is located on the image side of G1-3. In such embodiments, G1-1 may include one lens element and each of G1-2, G1-3, G2-1 and G2-2 may include two lens elements.

In some examples, the EFL can be varied continuously by independently changing the position of G1 and G2 along the second optical axis and by moving G1+G2 together with respect to the image sensor along the second optical axis.

In some examples, G1 and G2 may be moved together as one lens with respect to the image sensor for focusing. In some examples, the image sensor may be operative to be moved with respect to both G1 and G2 for optical image stabilization (OIS). The movement of the image sensor for OIS may be performed in two directions, wherein the two directions are perpendicular to a normal on the image sensor and perpendicular to each other In some examples, a camera as above or below may be included in a camera module having a shoulder height SH, and DA>SH. In some examples, SH is in the range 4 mm<SH<10 mm. In some examples, 5 mm<SH<8 mm.

In some examples DA>1.1×SH. In some examples DA>1.2×SH. In some examples DA>1.2×SH. In some examples, DA is in the range 5 mm<DA<11 mm and f/# is in the range 1.8<f/#<6.0. In some examples, DA is in the range 7 mm<DA<10 mm and f/# is in the range 2.0<f/#<5.0.

In some examples, a camera is included in a camera module having a camera module height MH in the range 6 mm<MH<12 mm. In some examples, 7 mm<MH<11 mm. In some examples in which SH is in the range 4 mm<SH<10 mm and MH is in the range 6 mm<MH<12 mm, a ratio SH/MH<0.9, or <0.8 or even <0.7.

In some examples, an f/# at $EFL_{MIN}$ is $f/\#_{MIN}$, an f/# at $EFL_{MAX}$ is $f/\#_{MAX}$, and a ratio $f/\#_{MAX}/f/\#_{MIN}<EFL_{MAX}/EFL_{MIN}$. In some examples, $f/\#_{MAX}/f/\#_{MIN}<EFL_{MAX}/1.1\times EFL_{MIN}$.

In some examples, the lens may be a cut lens, wherein all lens elements located at an image side of the OPFE are cut at an axis parallel to the second optical axis.

In some examples, the lens may be a cut lens, wherein all lens elements located at an object side of the OPFE are cut along an axis parallel to the first optical axis and wherein all lens elements located at an image side of the OPFE are cut along an axis parallel to the second optical axis.

In some examples with a cut lens, the lens is cut by 30% relative to an axial symmetric lens diameter. In some such examples, the SH is reduced by >20% by the cutting relative to an axial symmetric lens having a same lens diameter measured along an axis which is perpendicular to the first and the second optical axis of the lens. In some such examples, a ratio of SH/DA is decreased by >10%.

In some examples, G1-1 includes L1. In some examples, a focal length of $L_1$ is $f_1$, and $f_1<1.1\times EFL_{MIN}$.

In some examples, L1 is made from glass.

In some examples, N=9. In some examples, a power sequence of lens elements $L_1$-$L_9$ is plus-minus-minus-plus-minus-plus-minus-minus-plus.

In some examples, $L_2$ is the first lens element located at the image side of the OPFE, a distance between the OPFE and $L_2$ is marked $d_{M-L}$, and $d_{M-L}$ does not change for the continuous variation of EFL. In some examples, a ratio $d_{M-L}/TTL<7.5\%$.

In some examples, the last lens element $L_N$ is positive.

In some examples, $L_1$ is the only lens element located at an object side of the OPFE, a distance between $L_1$ and the OPFE is $\Delta LO$, and a ratio $\Delta LO/TTL<1\%$. In some examples, $\Delta LO/TTL<0.5\%$.

In some examples, the OPFE may be a mirror.

In some examples, $EFL_{MAX}/EFL_{MIN}>1.75$. In some examples, $EFL_{MAX}/EFL_{MIN}>1.9$.

In some examples, 30 mm<$EFL_{MAX}$<50 mm and 10 mm<$EFL_{MIN}$<30 mm.

In some examples, SD may be in the range 3 mm<SD<10 mm.

In various example embodiments, there are provided mobile devices including the camera as above or below, a mobile device having a device thickness T and a camera bump region, wherein the bump region has an elevated thickness T+B, wherein a first region of the camera is incorporated into the camera bump region and wherein a second region of the camera is not incorporated into the camera bump. The mobile devices may be smartphones. In some such mobile devices, N=9, the first region of the camera includes $L_1$ and the OPFE, and the second region of the camera includes lens elements $L_2$-$L_9$ and the image sensor. In some examples, a mobile device may in addition further include a second camera, the second camera including a second camera lens having a second EFL ($EFL_2$) wherein $EFL_2<EFL_{MIN}$.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

FIG. 1A illustrates a known folded Tele camera;
FIG. 1B illustrates a known dual-camera.

DETAILED DESCRIPTION

In the following detailed description, numerous specific details are set forth in order to provide a thorough understanding. However, it will be understood by those skilled in the art that the presently disclosed subject matter may be practiced without these specific details. In some instances, well-known methods and features have not been described in detail so as not to obscure the presently disclosed subject matter.

Figure 2A:
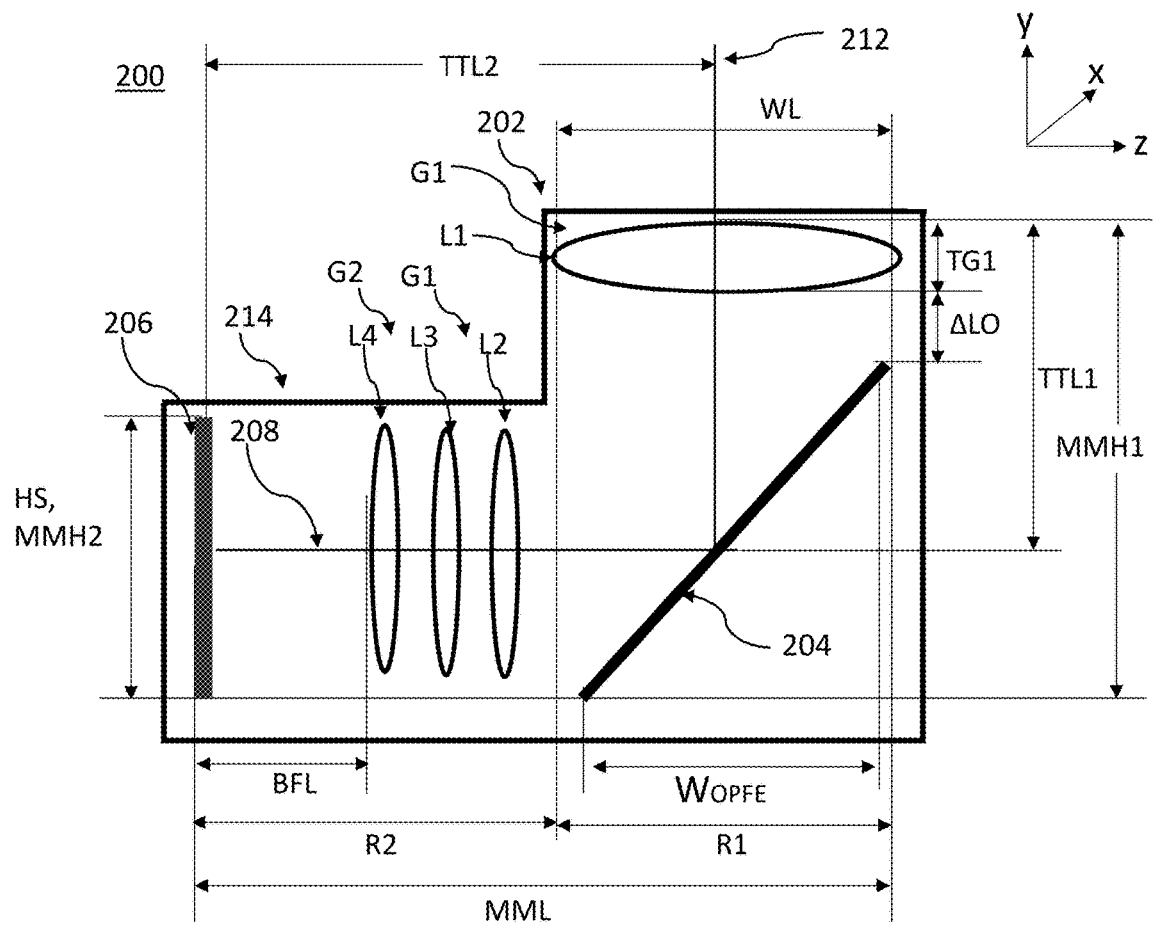
FIG. 2A shows schematically an embodiment of a folded Tele camera disclosed herein.

FIG. 2A shows schematically an embodiment of a folded continuous zoom Tele camera disclosed herein and numbered 200. Camera 200 comprises a lens 202 with a plurality of N lens elements. In lens 202 and for example N=4. The lens elements in lens 202 are numbered $L_1$-$L_4$, with $L_1$ being oriented towards an object side. Each lens element $L_i$ (wherein "i" is an integer between 1 and N). $L_1$ is axi-symmetric along a first optical (lens) axis 212, $L_2$-$L_4$ are axi-symmetric along a second optical (lens) axis 208. Lens 202 further includes an OPFE 204 that folds OP 212 to OP 208. Camera 200 also includes an image sensor 206. The camera elements may be included in a housing 214.

Lens 202 is divided into two or more lens groups G1 (here including $L_1$, OPFE 204 and $L_2$) and G2 (here including $L_3$ and $L_4$), wherein lens elements included in G1 are located at both an object side of OPFE 204 ($L_1$) and at an image side of OPFE 204 ($L_2$). G2 is located at an image side of OPFE 204.

For estimating theoretical limits for minimum dimensions of a camera module that includes optical lens systems such as presented in FIGS. 2A-2D and FIGS. 3A-3E, we introduce the following parameters and interdependencies:

MML and "Module Length" ("ML")

Minimum module length ("MML") is the theoretical lower limit for a length of a camera module that includes all components of camera 200.

Figure 3A:
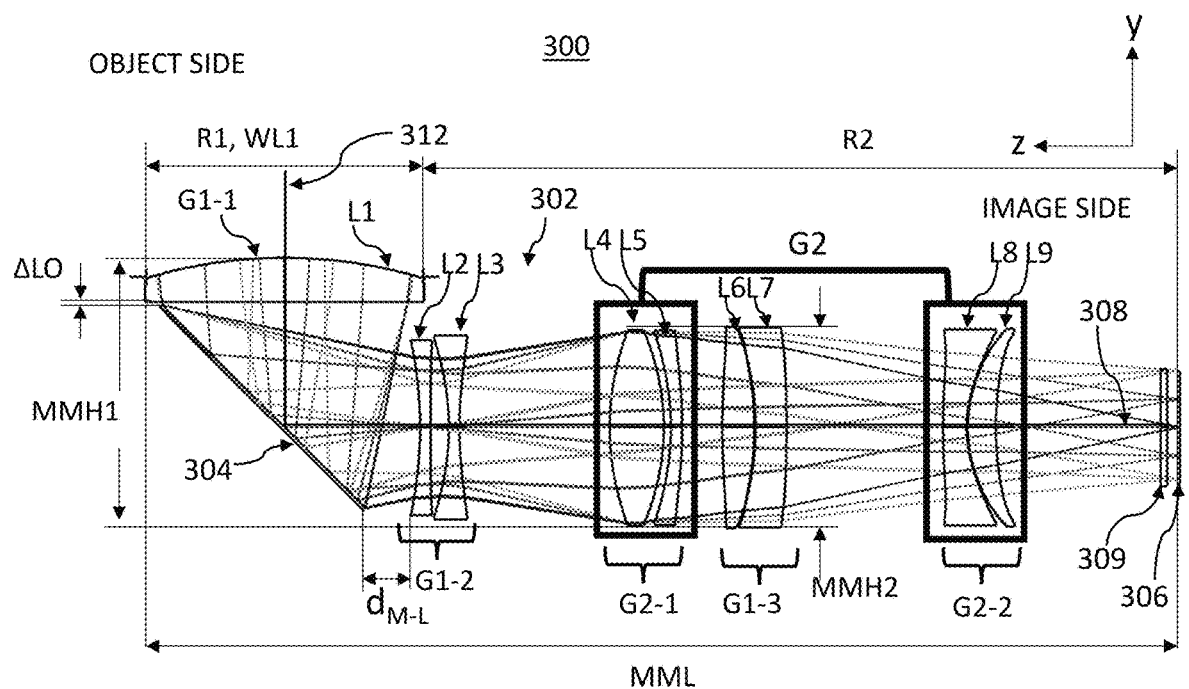
FIG. 3A shows schematically an embodiment of an optical lens system disclosed herein in a first zoom state.
Figure 3B:
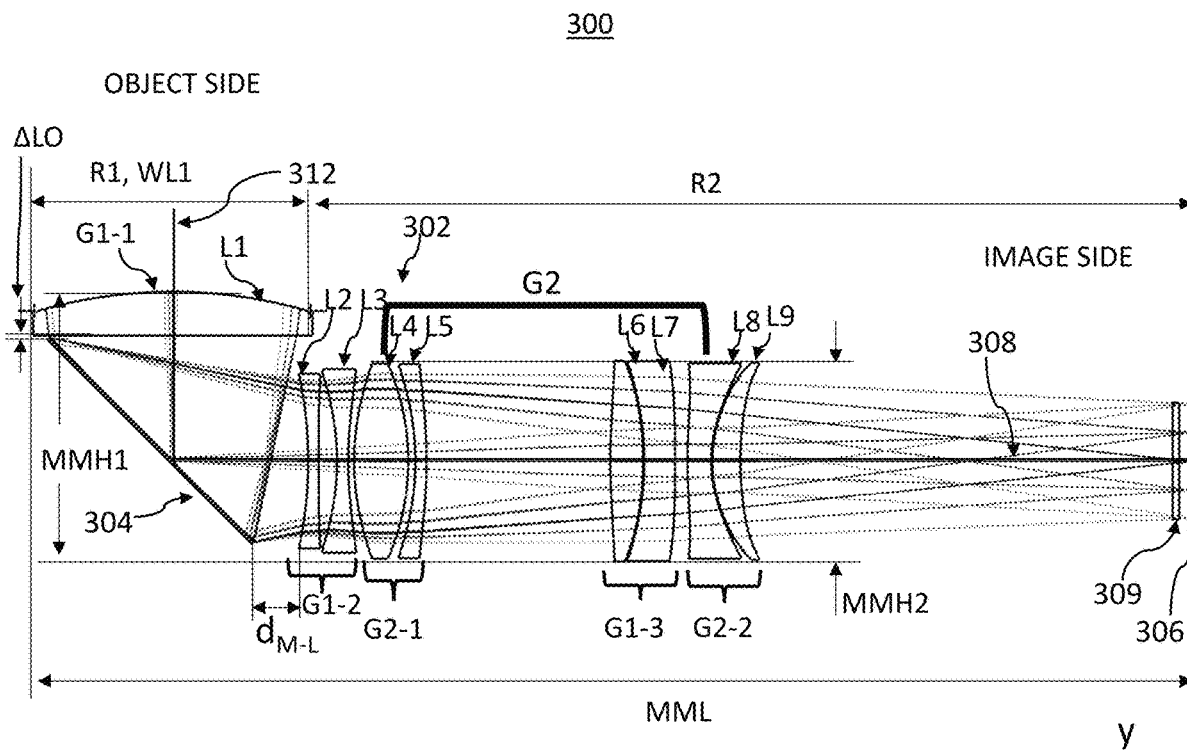
FIG. 3B shows schematically the embodiment of FIG. 3A disclosed herein in a second zoom state.

MML=max ($Z_{Lens}$, $Z_{OPFE}$)–$Z_{Sensor}$, max ($Z_{Lens}$, $Z_{OPFE}$) being the maximum value of a length occupied by lens 202 along the z-axis ($Z_{Lens}$) or by OPFE 204 ($Z_{OPFE}$), and $Z_{sensor}$ being the smallest value of a length occupied by image sensor 206 along the z-axis. In some examples and as shown in FIGS. 3A-B, $Z_{Lens}$>$Z_{OPFE}$, so that MML=$Z_{Lens}$–$Z_{Sensor}$.

For achieving a realistic estimation for a length of a camera module ("ML"), one may add for example a length of 3.5 mm to MML, i.e. ML=MML+3.5 mm (see Table 4). The additional length accounts for a lens stroke that may be required for AF, OIS as well as for image sensor packaging, housing, etc. For calculating ML, the highest value for MML when considering all possible EFLs is used, which is given by the value of MML at $EFL_{MAX}$.

R1

A first region ("R1") of MML, associated with a first minimum module height MMH1. MMH1 is the theoretical lower limit for a height of a camera module that includes all components of camera 200 that are located in R1.

R1=max(WL, $W_{OPFE}$), where WL is the width of G1 measured along the z-axis, and $W_{OPFE}$ is the width of OPFE 204 measured along the z-axis. In some examples and as shown in FIGS. 3A-E, WL>$W_{OPFE}$, so that R1 is determined solely by G1 and R1=WL.

Given a specific MML, it is beneficial to minimize R1, as it poses a lower limit for a bump length (BL), see FIG. 2A.

R2

A second region ("R2") of MML which is associated with a second minimum module height MMH2, whereas MMH2<MMH1.

R2=MML–R1.

For a given MML and for minimizing BL, it is beneficial to maximize R2 (minimize R1).

MMH1 and "Module Height" ("MH")

MMH1=$H_{OPFE}$+ΔLO+TG1, $H_{OPFE}$ being the height of OPFE 204 (OPFE 204 is oriented at 45 degree with respect to both the y-axis and the z-axis, so that $H_{OPFE}$=$W_{OPFE}$), ΔLO being the distance between the center of G1 and OPFE 204.

Figure 2B:
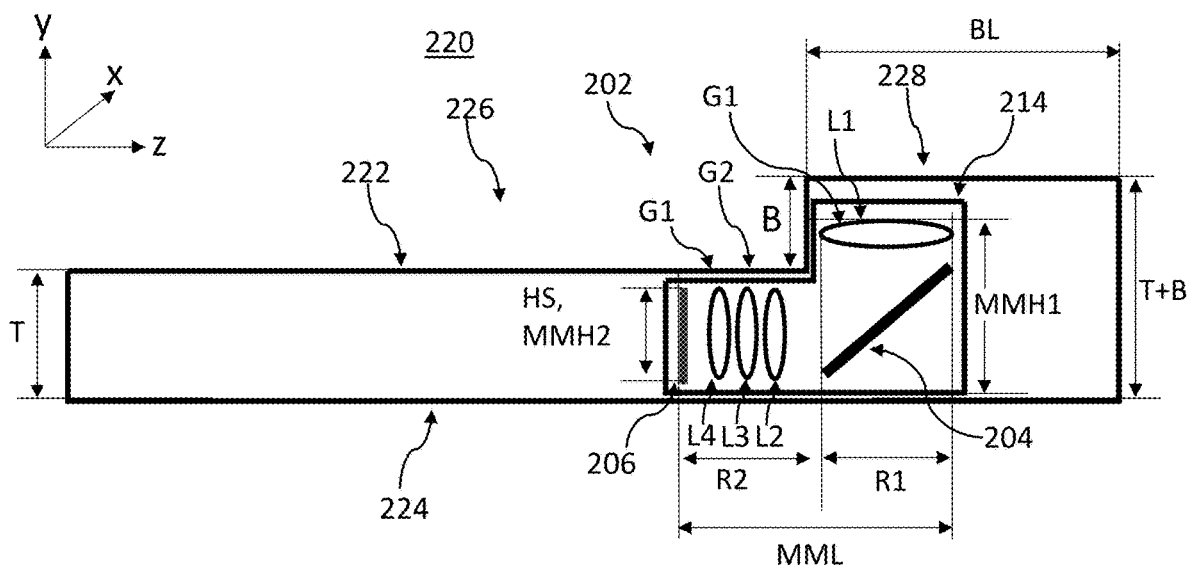
FIG. 2B shows schematically a mobile device with dimensions as described in FIG. 1C having an exterior surface and including a folded Tele camera as in FIG. 2A in a cross-sectional view.

In some examples and as shown in FIGS. 3A-B, lens elements in lens 202 have lower y-values than OPFE 204, so that MMH1 is determined by the highest y-value of G1 ($Y_{G1}$) and the lowest y-value of lens 202 ($Y_{Lens}$): MMH1=$Y_{G1}$–$Y_{Lens}$. In some examples that use a cut lens and as shown in FIGS. 3D-E, $Y_{Lens}$ is elevated so that $Y_{Lens}$>$Y_{OPFE}$, and MMH1 is not limited by the lens, but only by $H_{OPFE}$, as shown in FIG. 2B.

For achieving a realistic estimation for a camera module height, we calculate MH by adding an additional height of 1.5 mm to MMH1, i.e. MH=MMH1+1.5 mm (see Table 4). The additional length accounts for a lens stroke that may be required for AF as well as housing, lens cover etc.

MMH2 and "Shoulder Height" ("SH")

A second minimum module height ("MMH2") is the theoretical lower limit for a height of a camera module that includes all components of camera 200 in R2.

MMH2=min(HS, $H_{Lens}$), HS being the height of image sensor 206 and $H_{Lens}$ being the height of the highest lens element of lens 202 which is located in R2, both measured along the y-axis.

In some examples and as shown in FIG. 2A, MMH2 may be determined by image sensor 206, i.e. MMH2=HS. In other embodiments and as shown in FIGS. 3A-E, MMH2 may be determined by the lowest Y-value of mirror 304 on one side and by the height of lens elements $L_2$-$L_9$ on the other side.

For achieving a realistic estimation for a real camera shoulder height, shoulder height SH is calculated by adding an additional height of, for example, 1.5 mm to MMH2, i.e. SH=MMH2+1.5 mm (see Table 4). The additional height accounts for electrically and mechanically contacting sensor 206 as well as for housing.

A first advantage of folded camera 200 over a known folded camera such as camera 100 is that the aperture diameter DA of camera 200 is not necessarily limited by SH. In general, in a folded camera all lens elements are located on an image side of the OPFE, so that SH physically limits DA and SH>DA. This is not the case for camera 200, which enables DA>SH, allowing a relatively low f/# even at large ZFs.

In addition, given a specific size of an OPFE such as OPFE 204 (e.g. limited by T and/or B), camera 200 can provide a larger DA, allowing a relatively low f/# even at large ZFs. This is based on the fact that $L_1$ (or more generally, one or more lens elements included in G1 which are located at an object side of the OPFE) is located at an object side of OPFE 204. The optical power of $L_1$ reduces a diameter of a light cone entering folded camera 200 before the light cone impinges on OPFE 204, for a specific size of an OPFE allowing a larger amount of light to enter the camera than for a known folded camera not having any lens located at an object side of an OPFE.

The TTL of camera 200 is oriented not along one dimension, but along two dimensions. A first part ("TTL1") is parallel to OP 212, and a second part TTL2 ("TTL2") is parallel to OP 208. TTL is obtained by TTL=TTL1+TTL2. Therefore, TTL is not limited geometrically by TTL<MML−$W_{OPFE}$, so that for a given MML, a TTL can be significantly larger than for camera 100.

Figure 1C:
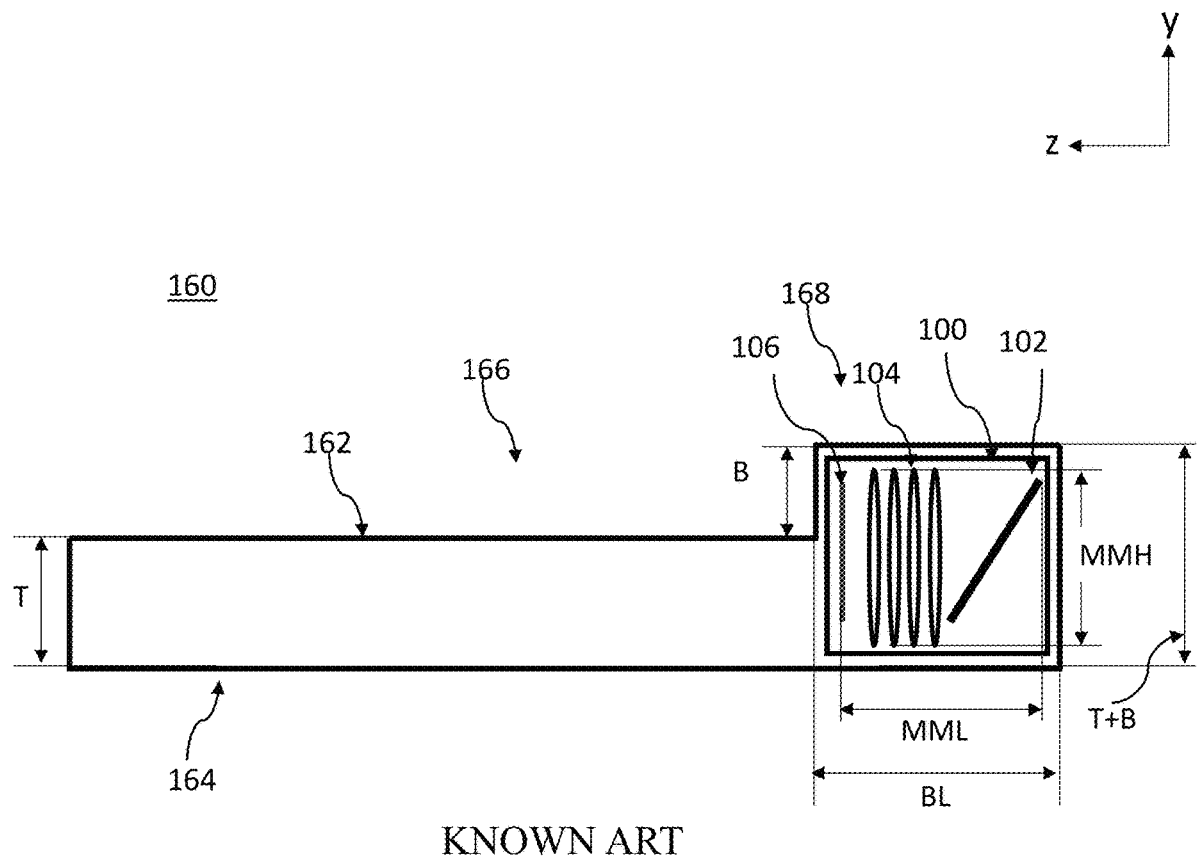
FIG. 1C shows schematically a known mobile device having an exterior surface and including a folded Tele camera.

FIG. 2B shows schematically a mobile device 220 (e.g. a smartphone) with dimensions as described in FIG. 1C having an exterior surface 222 and including a folded Tele camera 200 as disclosed herein in a cross-sectional view. A camera bump region is marked 228. A front surface 224 of mobile device 220 may e.g. include a screen (not visible). R1 of camera 200 is integrated into 224 of height T+B, while R2 of camera 200 is integrated into the regular device region 226 of height T. In comparison with mobile device 160, where camera 100 is entirely integrated into the bump region, mobile device 220, where camera 200 is integrated in the bump region only partially, can have a smaller BL or e.g. integrate additional cameras into 228, what is beneficial for industrial design reasons. In general and for slim mobile devices, it is beneficial to minimize MMH1 and MMH2.

Figure 2C:
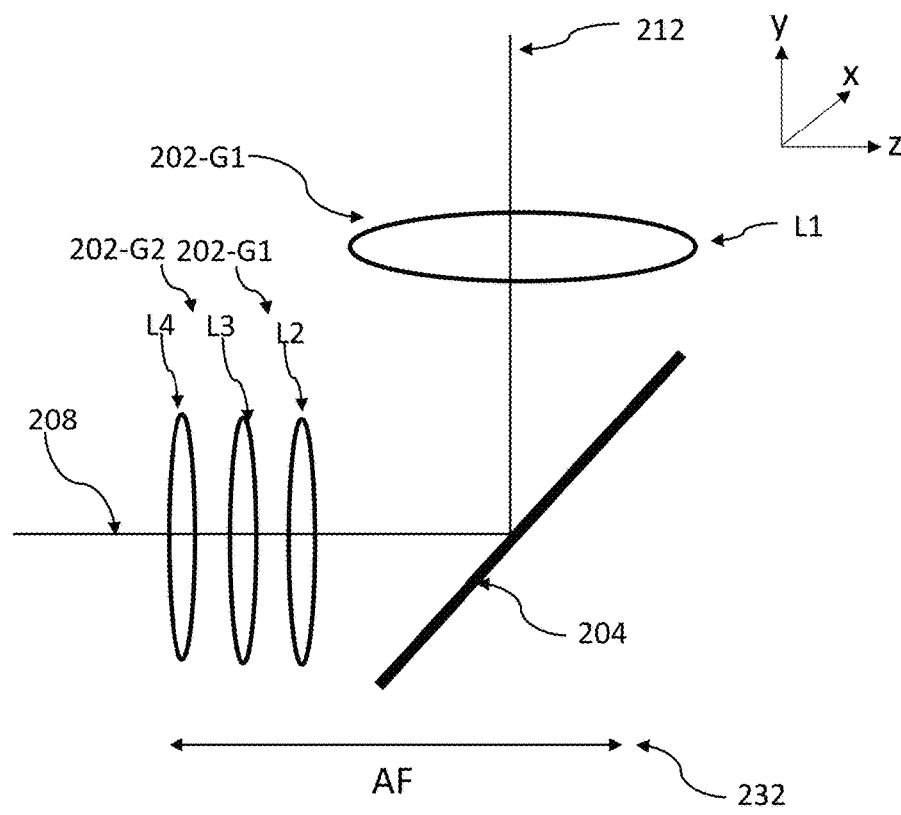
FIG. 2C shows an embodiment of an autofocus (AF) mechanism for the folded camera of FIG. 2A.
Figure 2D:
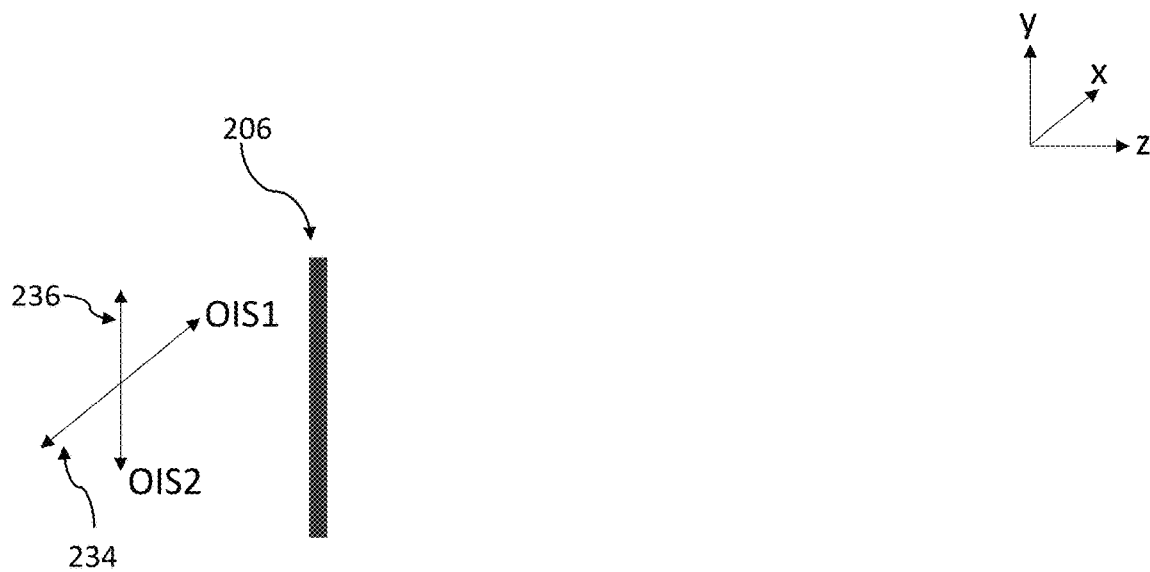
FIG. 2D shows an embodiment of an OIS mechanism for the folded camera of FIG. 2A.

FIG. 2C shows how autofocus (AF) is performed in camera 200 in one example. FIG. 2D shows schematically how optical image stabilization (OIS) is performed in camera 200 in one example. Lens 202 including OPFE 204 are shown in a same orientation as in FIGS. 2A-B. For illustration purposes, FIG. 2C and FIG. 2D show only the components of camera 200 that are moved for AF or OIS respectively. Lens 202 including OPFE 204 is moved as one unit relative to the image sensor (not shown) along an axis parallel to the z-axis for AF, as shown by arrow 232. Moving lens 202 including OPFE 204 as one unit means that the distances between the N lens elements (here $L_1$-$L_4$) and between lens 202 and OPFE 204 do not change. Only the distance to the image sensor (not shown) changes. Since the lens (including the OPFE) is moved relative to the image sensor, one may speak of "lens AF".

Image sensor 206 is shown in a same orientation as in FIGS. 2A-B. Image sensor 206 is moved relative to lens 202 (not shown here) including OPFE 204 (not shown here) along a first sensor OIS axis ("OIS1") parallel to the x-axis for performing OIS along a first axis, as shown by arrow 234. Image sensor 206 is moved relative to lens 202 (not shown here) including OPFE 204 (not shown here) along a second sensor OIS axis ("OIS2") parallel to the y-axis for performing OIS along a second axis, as shown by arrow 236. Since the image sensor is moved relative to the other camera components, one may speak of "sensor OIS".

FIGS. 3A-3E illustrate optical lens systems disclosed herein. All lens systems shown can be included in a folded camera and a mobile device such as shown in FIGS. 2A-B. It is noted that all embodiments disclosed herein are beneficially used in smartphones.

FIG. 3A shows schematically an embodiment of an optical lens system disclosed herein and numbered 300 in a first, minimal zoom state with an $EFL_{MIN}$=20 mm. Lens system 300 comprises a lens 302 including an OPFE 304 (here exemplarily a mirror), an optical element 309, and an image sensor 306. System 300 is shown with ray tracing. Optical element 309 is optional and may be for example an infra-red (IR) filter, and/or a glass image sensor dust cover. In other embodiments, OPFE 304 may be a prism.

Lens 302 includes mirror 304 as well as a plurality of N lens elements $L_i$. In this example of lens 302, N=9. $L_1$ is the lens element closest to the object side and $L_N$ is the lens element closest to the image side, i.e. the side where the image sensor is located. This order holds for all lenses and lens elements disclosed herein. $L_1$ is axi-symmetric along a first optical (lens) axis 312, $L_2$-$L_9$ are axi-symmetric along a second optical (lens) axis 308. Each lens element $L_i$ comprises a respective front surface $S_{2i-1}$ (the index "2i-1" being the number of the front surface) and a respective rear surface $S_{2i}$ (the index "2i" being the number of the rear surface), where "i" is an integer between 1 and N. This numbering convention is used throughout the description. Alternatively, as done throughout this description, lens surfaces are marked as "$S_k$", with k running from 1 to 2N.

In all optical lens systems disclosed herein, aperture diameter DA of the camera is determined by $L_1$.

As used herein the term "front surface" of each lens element refers to the surface of a lens element located closer to the entrance of the camera (camera object side) and the term "rear surface" refers to the surface of a lens element located closer to the image sensor (camera image side).

FIG. 3B shows optical lens system 300 in a second, maximal zoom state with an $EFL_{MAX}$=40 mm. For changing ZF, G2 is moved with respect to G1 and image sensor 306 and additionally G1+G2 are moved together as one lens with respect to image sensor 306 (for focusing to infinity) as described in Table 3 and FIG. 3C. For focusing to a finite distance, G1 and G2 are moved together as one lens with respect to image sensor 306.

Mirror 304 is oriented at an angle of 45 degrees with respect to the y-axis and the z-axis. Optical rays pass through G1-1, are reflected by mirror 304, pass successively through G1-2, G2-1, G1-3 and G2-2, and form an image on image sensor 306. FIGS. 3A-B and FIGS. 3D-E show five fields with 3 rays for each field.

MMH 1 and MMH2 are defined by $L_2$-$L_9$, in particular MMH2 is defined by the largest lens element $L_6$. Values are given in Table 4. Detailed optical data and surface data are given in Tables 1-3 for the example of the lens elements in FIGS. 3A-B and FIGS. 3D-E. The values provided for these examples are purely illustrative and according to other examples, other values can be used.

Surface types are defined in Table 1. The coefficients for the surfaces are defined in Table 2. The surface types are:
a) Plano: flat surfaces, no curvature
b) Q type 1 (QT1) surface sag formula:

it. Thicknesses relative to the mirror are with respect to optical axis. Movements between lens elements required for continuously switching between $EFL_{MIN}$ and $EFL_{MAX}$ as well as HFOV and f/# are given in Table 3.

TABLE 1

Embodiment 300
EFL = See Table 3, F number = See Table 3, HFOV = See Table 3.

| Surface # | Comment | Type | Curvature Radius | Thickness | Aperture Radius (D/2) | Material | Index | Abbe # | Focal Length |
|---|---|---|---|---|---|---|---|---|---|
| 1 | Stop | Plano | Infinity | −0.950 | 4.92 | | | | |
| 2 | Lens 1 | ASP | 15.651 | 1.420 | 4.92 | Glass | 1.74 | 50.77 | 20.95 |
| 3 | | Plano | Infinity | 4.070 | 4.404 | | | | |
| 4 | Mirror | Plano | Infinity | 4.387 | 5.892 | | | | |
| 5 | Lens 2 | ASP | −14.057 | 0.338 | 2.805 | Plastic | 1.54 | 55.93 | −24.52 |
| 6 | | | 283.796 | 0.596 | 2.805 | | | | |
| 7 | Lens 3 | ASP | −8.312 | 0.363 | 2.807 | Plastic | 1.61 | 25.59 | −8.11 |
| 8 | | | 12.879 | See Table 3 | 2.949 | | | | |
| 9 | Lens 4 | ASP | 8.376 | 1.750 | 3.100 | Plastic | 1.53 | 55.69 | 7.98 |
| 10 | | | −8.118 | 0.229 | 3.137 | | | | |
| 11 | Lens 5 | ASP | −9.137 | 0.365 | 3.097 | Plastic | 1.59 | 28.36 | −37.74 |
| 12 | | | −15.703 | See Table 3 | 3.124 | | | | |
| 13 | Lens 6 | ASP | 21.948 | 1.059 | 3.223 | Plastic | 1.53 | 55.69 | 12.97 |
| 14 | | | −10.017 | 0.040 | 3.223 | | | | |
| 15 | Lens 7 | ASP | −9.125 | 0.996 | 3.203 | Plastic | 1.61 | 25.59 | −17.22 |
| 16 | | | −66.251 | See Table 3 | 3.208 | | | | |
| 17 | Lens 8 | ASP | 16.458 | 0.767 | 3.143 | Plastic | 1.53 | 55.69 | −10.67 |
| 18 | | | 4.178 | 0.035 | 3.079 | | | | |
| 19 | Lens 9 | ASP | 4.426 | 0.911 | 3.173 | Plastic | 1.66 | 20.37 | 10.51 |
| 20 | | | 11.033 | See Table 3 | 3.102 | | | | |
| 21 | Filter | Plano | Infinity | 0.210 | — | Glass | 1.52 | 64.17 | |
| 22 | | | Infinity | 0.414 | — | | | | |
| 23 | Image | Plano | Infinity | — | — | | | | |

$$z(r) = \frac{cr^2}{1 + \sqrt{1 - (1+k)c^2 r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}}, \quad x = u^2$$

$Q_0^{con}(x) = 1$  $Q_1^{con} = -(5 - 6x)$  $Q_2^{con} = 15 - 14x(3 - 2x)$ $Q_3^{con} = -\{35 - 12x[14 - x(21 - 10x)]\}$ $Q_4^{con} = 70 - 3x\{168 - 5x[84 - 11x(8 - 3x)]\}$ $Q_5^{con} = -[126 - x(1260 - 11x\{420 - x[720 - 13x(45 - 14x)]\})]$ where {z, r} are the standard cylindrical polar coordinates, c is the paraxial curvature of the surface, k is the conic parameter, $r_{norm}$ is generally one half of the surface's clear aperture, and $A_n$ are the polynomial coefficients shown in lens data tables. The Z axis is positive towards image. Values for CA are given as a clear aperture radius, i.e. CA/2. CA can change with varying EFL, values for an effective aperture diameter are given in Table 4. These values are also used for calculating a F/# in Table 3. The reference wavelength is 555.0 nm. Units are in mm except for refraction index ("Index") and Abbe #. Each lens element $L_i$ has a respective focal length $f_i$, given in Table 1. The FOV is given as half FOV (HFOV). The definitions for surface types, Z axis, CA values, reference wavelength, units, focal length and HFOV are valid for all further presented Tables. Mirror's widths are 9.4 mm×7.1 mm, and it is tilted by 45 deg. The semi-diameter of the mirror is defined by the circle that encloses

TABLE 2

Aspheric Coefficients

| Surface # | Conic | A4 | A6 | A8 | A10 |
|---|---|---|---|---|---|
| 2 | 0 | 2.79E−06 | 5.98E−08 | −3.15E−09 | 0 |
| 3 | 0 | 0 | 0 | 0 | 0 |
| 5 | 0 | −3.23E−04 | 8.53E−06 | 1.06E−06 | −3.16E−08 |
| 6 | 0 | 5.93E−04 | 1.80E−05 | −1.71E−06 | −1.30E−07 |
| 7 | 0 | 5.34E−04 | −6.56E−06 | −2.96E−08 | 7.66E−08 |
| 8 | 0 | −1.32E−03 | 5.25E−07 | 6.71E−07 | 1.09E−07 |
| 9 | 0 | −3.29E−04 | 3.25E−06 | −7.57E−07 | −5.33E−08 |
| 10 | 0 | −5.16E−04 | 2.28E−05 | 1.68E−06 | −1.26E−08 |
| 11 | 0 | −1.75E−04 | 1.61E−05 | 9.50E−07 | 1.08E−07 |
| 12 | 0 | 7.92E−04 | 1.33E−05 | 8.13E−07 | −7.67E−08 |
| 13 | 0 | −9.88E−04 | −2.02E−05 | −7.21E−07 | 2.34E−07 |
| 14 | 0 | −2.93E−05 | −1.73E−05 | −3.04E−06 | 5.30E−08 |
| 15 | 0 | 3.70E−04 | 2.29E−05 | 1.12E−06 | −3.99E−07 |
| 16 | 0 | −1.09E−03 | 9.29E−07 | 3.69E−06 | −2.29E−07 |
| 17 | 0 | −2.53E−03 | −5.16E−05 | 4.33E−07 | 4.12E−07 |
| 18 | 0 | −3.98E−03 | −9.74E−05 | −1.28E−07 | 3.98E−07 |
| 19 | 0 | −1.77E−03 | −2.72E−07 | 1.93E−06 | 6.58E−07 |
| 20 | 0 | −1.08E−05 | 6.90E−05 | 3.89E−06 | 6.87E−07 |

TABLE 3

Zoom Extremities

| | $EFL_{MIN}$ = 20 mm | $EFL_{MAX}$ = 40 mm |
|---|---|---|
| Surface 8 | 4.852 | 0.188 |
| Surface 12 | 1.297 | 5.960 |
| Surface 16 | 5.058 | 0.396 |
| Surface 20 | 5.348 | 14.015 |
| F# | 2.44 | 4.49 |
| HFOV [deg] | 7.81 | 3.99 |

Figure 3C:
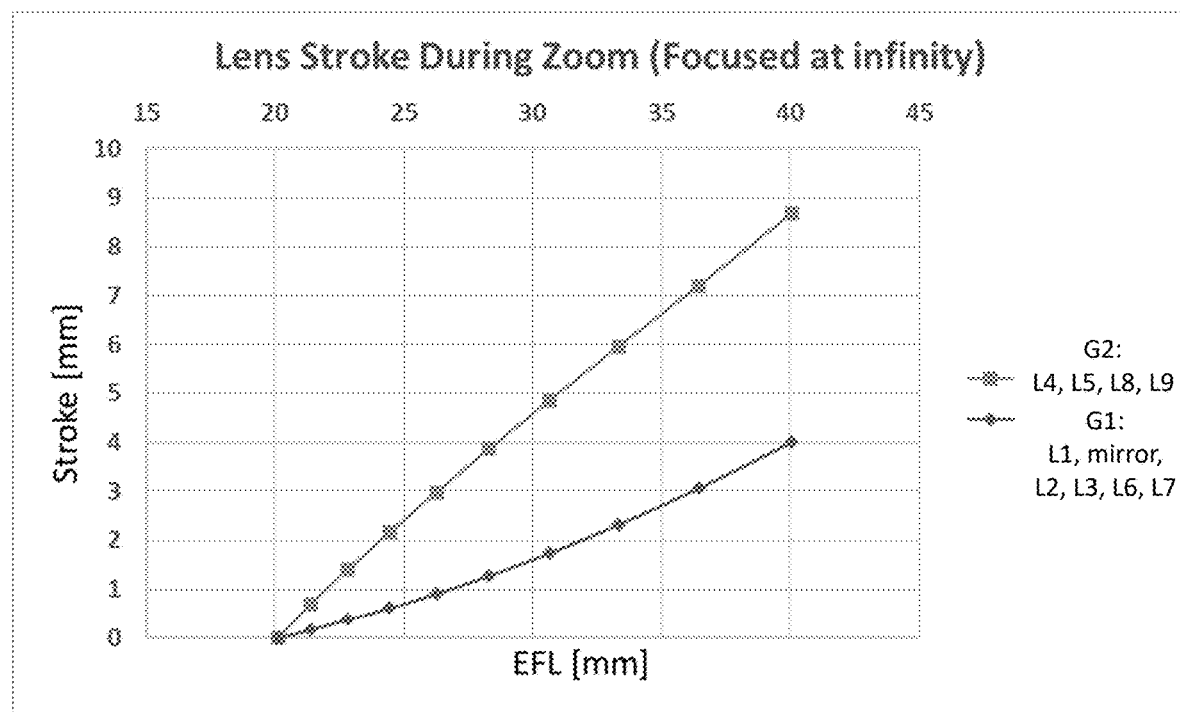
FIG. 3C shows a required lens stroke for continuous zooming the optical lens system of FIGS. 3A-B.
Figure 3D:
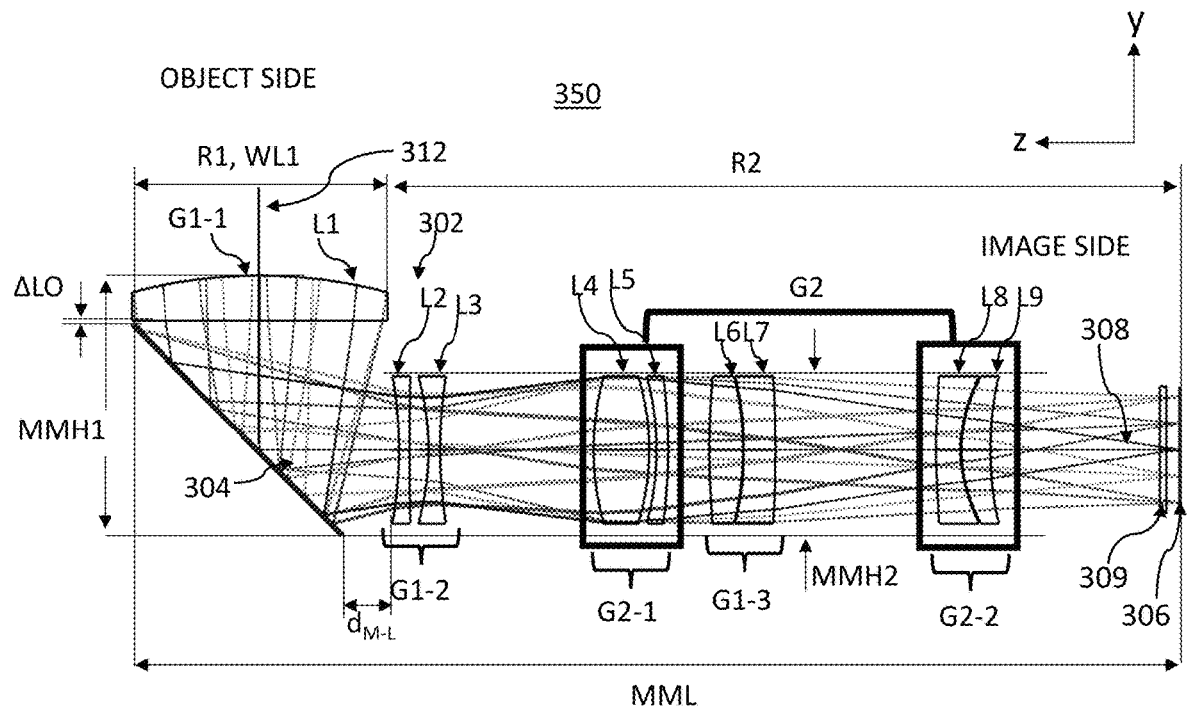
FIG. 3D shows schematically another embodiment of an optical lens system disclosed herein in a first zoom state.
Figure 3E:
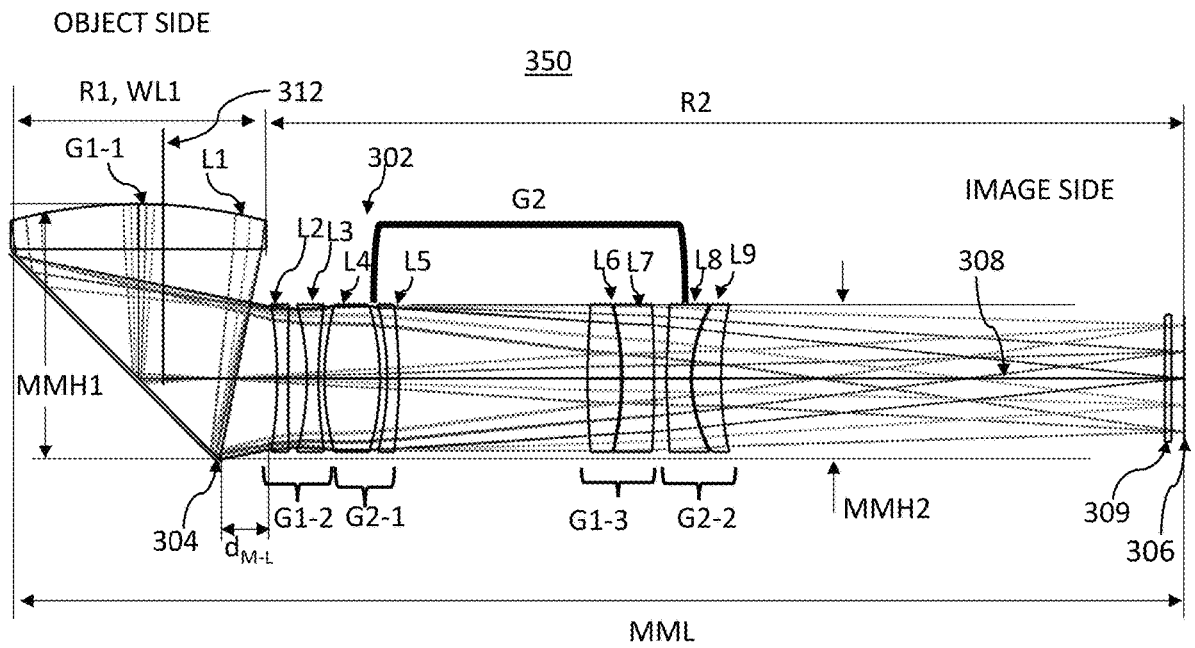
FIG. 3E shows schematically the embodiment of FIG. 3D disclosed herein in a second zoom state.

FIG. 3C shows the movements for each component of lens 302 relative to image sensor 306 that are required to continuously switch between different EFLs (i.e. ZFs) so that focusing to infinity is preserved. Based on that movement, two lens groups G1 and G2 can be defined. G1 includes $L_1$, mirror 304, $L_2$, $L_3$, $L_6$ and $L_7$. G2 includes $L_4$, $L_5$, $L_8$ and $L_9$.

The continuous variation in EFL is obtained by an independent relative movement of G1 and G2 and by moving G1+G2 together with respect to the image sensor, both movements performed along optical axis 308. All components included in G1 and G2 respectively are fixedly coupled to each other, meaning that they can move with respect to other components included in optical system 300, e.g. with respect to image sensor 306, but they do not move with respect to each other. Explicitly, G1-1 does not move with respect to mirror 304, G1-2 and G1-3. G2-1 does not move with respect to G2-2. As shown, a maximum movement stroke of G2 with respect to sensor 306 is 8.7 mm, a maximum movement stroke of G1 with respect to sensor 306 is 4.0 mm.

As shown in FIGS. 3A-B, G1 includes three lens element groups G1-1 (including $L_1$), G1-2 (including $L_2$ and $L_3$) and G1-3 (including $L_6$ and $L_7$). G2 includes lens element groups G2-1 (including $L_4$ and $L_5$) and G2-2 (including $L_8$ and $L_9$). The numbering of G1-1, G1-2 etc. is done according to the lens element group's position along the optical path 312 and 308 respectively, starting form an object side of camera 300.

$d_{M-L}$ is a distance measured between mirror 304 and $L_2$, as indicated in FIGS. 3A-B and FIGS. 3D-E. $d_{M-L}$ does not change for continuous variation in EFL. I.e. when changing ZF, there is no relative movement between mirror 304 and $L_2$.

FIG. 3D shows schematically another embodiment of an optical lens system disclosed herein and numbered 350 in a first, minimal zoom state with $EFL_{MIN}$=20 mm. Lens system 350 comprises a lens 302-C including a mirror 304, an optical element 309 (optional) and an image sensor 306. Lens 350 is obtained by cutting lens elements of optical lens system 300:

$L_1$ is cut to 8 mm (D/2=4 mm), i.e. WL1=8 mm.
$L_2$-$L_9$ are cut to 4.6 mm (D/2=2.3 mm).

The cutting of L1 is performed along a direction parallel to the y-axis, reducing WL1 measured along the z-axis. With respect to optical lens system 300, this leads to a smaller R1 and a smaller MML. The cutting of $L_2$-$L_9$ is performed along a direction parallel to the z-axis, reducing the width of the lens elements measured along the y-axis. With respect to optical lens system 300, this leads to a smaller MMH1 and a smaller MMH2.

Figure 7:
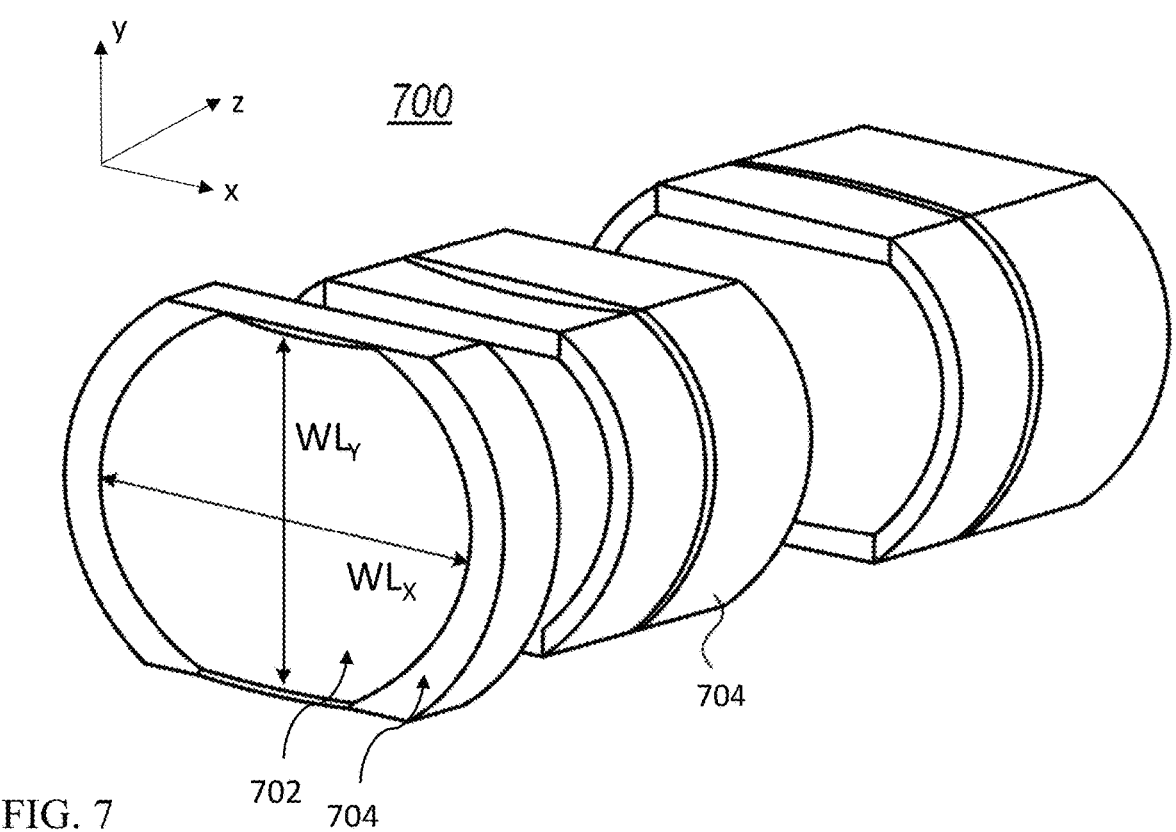
FIG. 7 shows a lens barrel that includes a plurality of cut lens elements and a lens housing.

Referring to the coordinate system shown in FIG. 7, the cutting is performed so that a width of lens WL measured along a y-direction ("$WL_Y$") is smaller than in a WL measured along a x-direction ("$WL_X$"), i.e. $WL_Y$<$WL_X$ (see FIG. 7).

With respect to the diameter of the largest lens element in 302 (L6), 302-C is cut by about 30%. As of the cutting, MMH1 and MMH2 are not defined by $L_2$-$L_9$, but by mirror 304. With respect to the uncut lens 302, for the cut lens 302-C SH is reduced by 18% and the SH/DA ratio is decreased by 12% (see Table 4).

FIG. 3E shows optical lens system 350 in a second, maximal zoom state with an $EFL_{MAX}$=40 mm.

Table 4 summarizes values and ratios thereof of various features that are included in the lens systems 300 and 350 shown in FIGS. 3A-3E ($d_{M-L}$, ΔLO, SD, TTL, MML, DA, $H_{L6}$, MMH, R1, R2, SH, MH are given in mm. The values in the column "ratio 350/300" are calculated by dividing a respective value achieved in optical lens system 350 by a value achieved in optical lens system 300. The values in the column "range" represent preferred ranges that may be included in other examples.

DA is the aperture diameter. For all lens systems, an effective aperture diameter is given.

$H_{L6}$ is the height of the largest lens element which is located at an image side of mirror 304.

F/#$_{MIN}$ and F/#$_{MAX}$ represent a F/# at $EFL_{MIN}$ and $EFL_{MAX}$ respectively.

TABLE 4

| | Lens system | | Ratio | |
| Feature | 300 | 350 | 350/300 | Range |
| --- | --- | --- | --- | --- |
| $d_{M-L}$ | 1.45 | 1.54 | 1.06 | 0-5 |
| ΔLO | 0.07 | 0.07 | 1.00 | |
| SD | 5.6 | 5.6 | 1.00 | 3-12 |
| TTL ($EFL_{MIN}$) | 34.5 | 34.5 | 1.00 | 20-60 |
| TTL ($EFL_{MAX}$) | 38.5 | 38.5 | 1.00 | 20-60 |
| MML ($EFL_{MIN}$) | 33.9 | 33 | 0.97 | 20-60 |
| MML ($EFL_{MAX}$) | 37.9 | 37 | 0.98 | 20-60 |
| DA ($EFL_{MIN}$) | 8.2 | 7.6 | 0.93 | 5-11 |
| DA ($EFL_{MAX}$) | 8.9 | 8.8 | 0.99 | 5-11 |
| $H_{L6}$ | 6.45 | 4.6 | 0.71 | 4-8 |
| MMH1 | 8.7 | 8.1 | 0.93 | 5-10 |
| MMH2 | 5.9 | 5 | 0.85 | 3-9 |
| R1 = WL1 | 9.4 | 8 | 0.85 | 6-12 |
| R2 ($EFL_{MIN}$) | 24.5 | 25 | 1.02 | 15-50 |
| R2 ($EFL_{MAX}$) | 28.5 | 29 | 1.02 | 15-50 |
| SH | 7.4 | 6.1 | 0.82 | 4-10 |
| MH | 10.2 | 9.6 | 0.94 | 6-12 |
| ML | 41.4 | 40.5 | 0.98 | 25-70 |
| DA/SH ($EFL_{MIN}$) | 1.11 | 1.25 | 1.12 | |
| DA/SH ($EFL_{MAX}$) | 1.20 | 1.44 | 1.20 | |
| SH/MH | 0.73 | 0.64 | 0.88 | |
| $EFL_{MIN}$ | 20 | 20 | 1.00 | 8-25 |
| $EFL_{MAX}$ | 40 | 40 | 1.00 | 15-50 |
| F/#$_{MIN}$ | 2.44 | 2.63 | 1.08 | 1.8-3.5 |
| F/#$_{MAX}$ | 4.49 | 4.55 | 1.01 | 3.0-6.0 |
| F/#$_{MAX}$/F/#$_{MIN}$ | 1.84 | 1.73 | 0.94 | |
| ΔLO/TTL ($EFL_{MIN}$) | 0.2% | 0.2% | 1.00 | 0.05-5% |
| $d_{M-L}$/TTL ($EFL_{MIN}$) | 4.2% | 4.4% | 1.06 | 1%-10% |

As explained below, a clear height value $CH(S_k)$ can be defined for each surface $S_k$ for 1≤k≤2N), and a clear aperture value $CA(S_k)$ can be defined for each surface $S_k$ for 1≤k≤2N). $CA(S_k)$ and $CH(S_k)$ define optical properties of each surface $S_k$ of each lens element. The CH term is defined with reference to FIG. 5A and the CA term is defined with reference to FIG. 5B, below.

Figure 6:
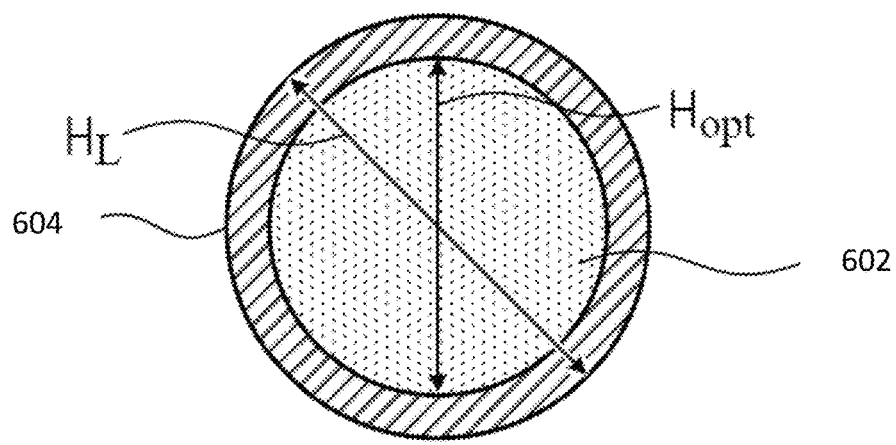
FIG. 6 provides definitions of $H_L$ and $H_{opt}$.

In addition, a height ("$H_{Li}$", for 1≤i≤N) is defined for each lens element $L_i$. $H_{Li}$ corresponds, for each lens element $L_i$, to the maximal height of lens element $L_i$ measured along an axis perpendicular to the optical axis of the lens elements. For a given lens element, the height is greater than, or equal to the clear height value CH and the clear aperture value CA of the front and rear surfaces of this given lens element. Typically, for an axial symmetric lens element, $H_{Li}$ is the diameter of lens element $L_i$ as seen in FIG. 6. Typically, for an axial symmetric lens element, $H_{Li}$=max {$CA(S_{2i-1})$, $CA(S_{2i})$}+a mechanical part size. In general, in lens design the mechanical part size is defined as not contributing to the optical properties of the lens. Because of this, one defines two heights of a lens: an optical height $H_{opt}$ (corresponding to the CA value) of an optically active area 602 and a geometrical (or mechanical) height of the lens $H_L$ of an entire lens area 604 which covers an optically active and an optically inactive area. The mechanical part and its properties are defined below. The mechanical part size contribution to $H_{Li}$ is typically 200-1000 µm.

Figure 4A:
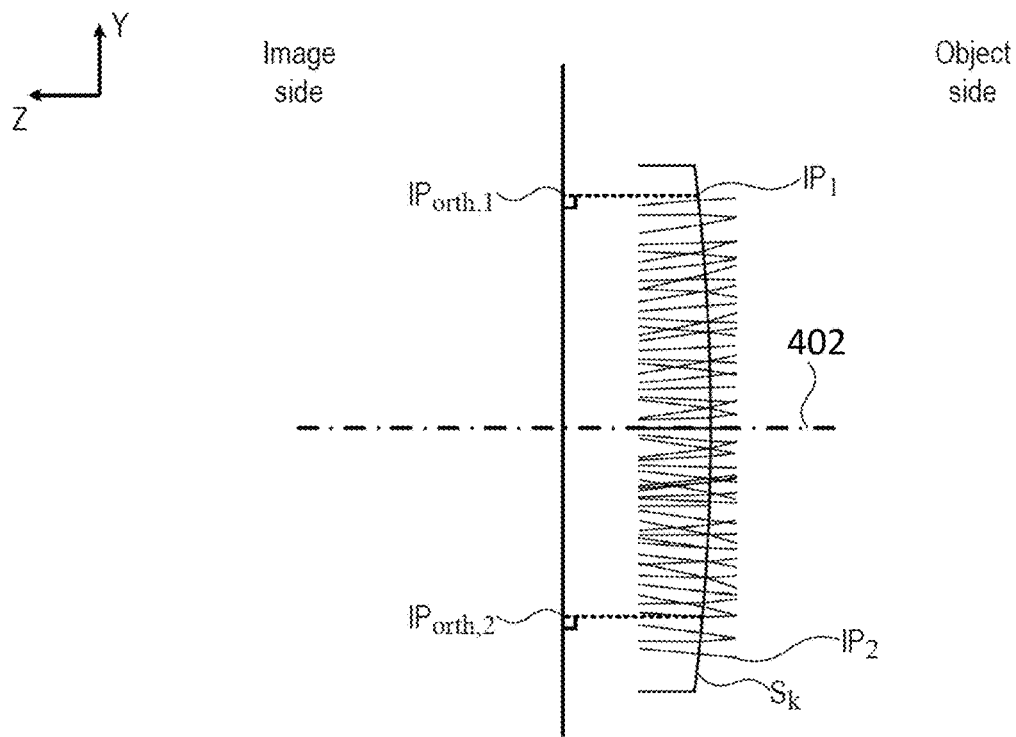
FIG. 4A illustrates orthogonal projections $IP_{orth,1}$, $IP_{orth,2}$ of two impact points $IP_1$ and $IP_2$ on a plane P.
Figure 4B:
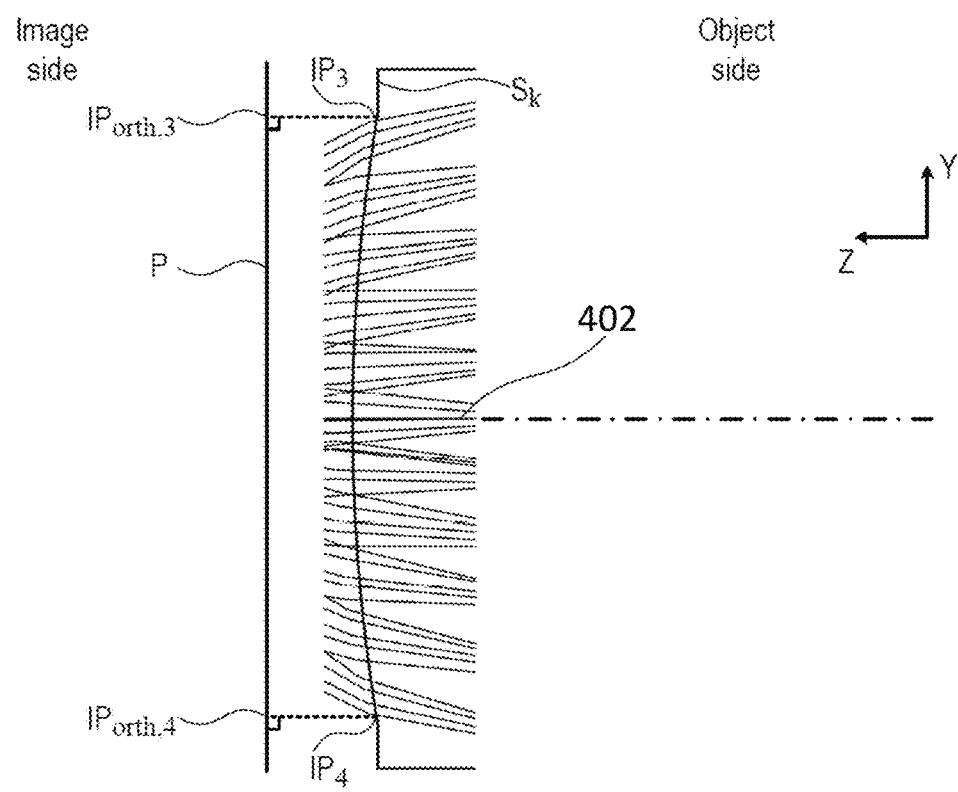
FIG. 4B illustrates orthogonal projections $IP_{orth,3}$, $IP_{orth,4}$ of two impact points $IP_3$ and $IP_4$ on plane P.

As shown in FIGS. 4A, 4B and 5A, 5B, each optical ray that passes through a surface $S_k$ (for $1 \leq k \leq 2N$) impinges this surface on an impact point IP. Optical rays enter camera 200 from surface $S_1$ and pass through surfaces $S_2$ to $S_{2N}$. Some optical rays can impinge on any surface $S_k$ but cannot/will not reach image sensor 206. For a given surface $S_k$, only optical rays that can form an image on image sensor 206 are considered. $CH(S_k)$ is defined as the distance between two closest possible parallel lines (see lines 500 and 502 in FIG. 5A located on a plane P orthogonal to the optical axis of the lens elements. In the representation of FIGS. 4A and 4B, plane P is parallel to plane X-Y and is orthogonal to optical axis 402 such that the orthogonal projection $IP_{orth}$ of all impact points IP on plane P is located between the two parallel lines. $CH(S_k)$ can be defined for each surface $S_k$ (front and rear surfaces, with $1 \leq k \leq 2N$).

The definition of $CH(S_k)$ does not depend on the object currently imaged, since it refers to the optical rays that "can" form an image on the image sensor. Thus, even if the currently imaged object is located in a black background that does not produce light, the definition does not refer to this black background since it refers to any optical rays that "can" reach the image sensor to form an image (for example optical rays emitted by a background that emits light, contrary to a black background).

For example, FIG. 4A illustrates the orthogonal projections $IP_{orth,1}$, $IP_{orth,2}$ of two impact points $IP_1$ and $IP_2$ on plane P which is orthogonal to optical axis 402. By way of example, in the representation of FIG. 4A, surface $S_k$ is convex.

FIG. 4B illustrates the orthogonal projections $IP_{orth,3}$, $IP_{orth,4}$ of two impact points $IP_3$ and $IP_4$ on plane P. By way of example, in the representation of FIG. 4B, surface $S_k$ is concave.

Figure 5A:
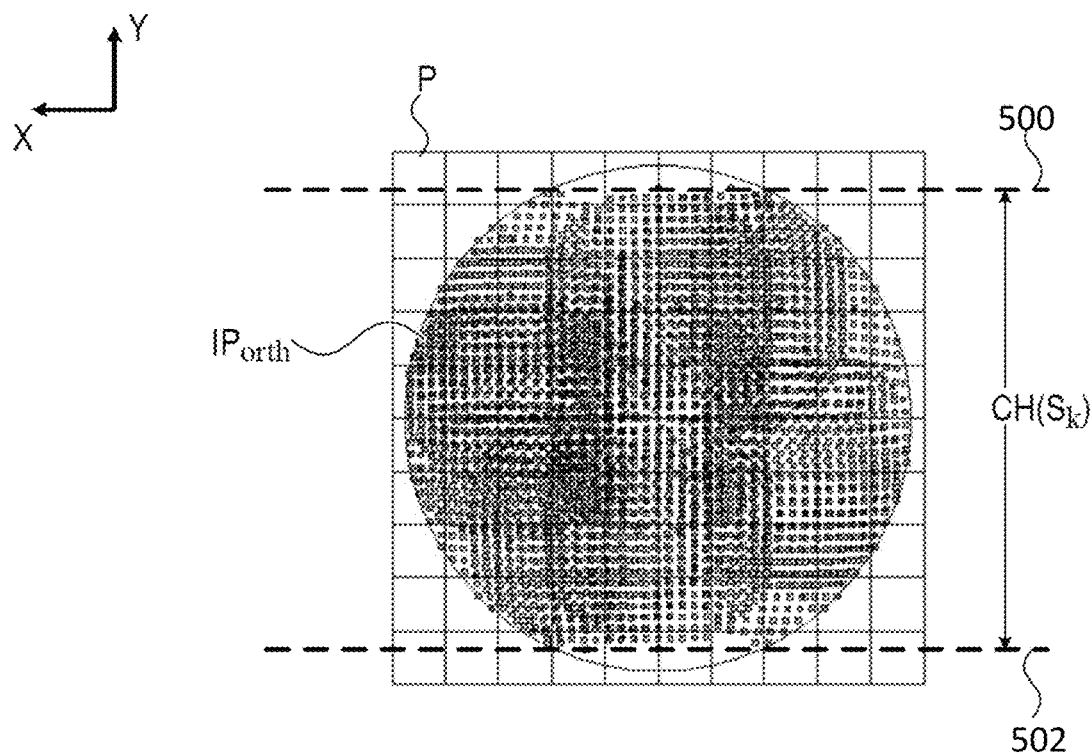
FIG. 5A provides a definition of clear height (CH)

In FIG. 5A, the orthogonal projection $IP_{orth}$ of all impact points IP of a surface $S_k$ on plane P is located between parallel lines 500 and 502. $CH(S_k)$ is thus the distance between lines 500 and 502.

Figure 5B:
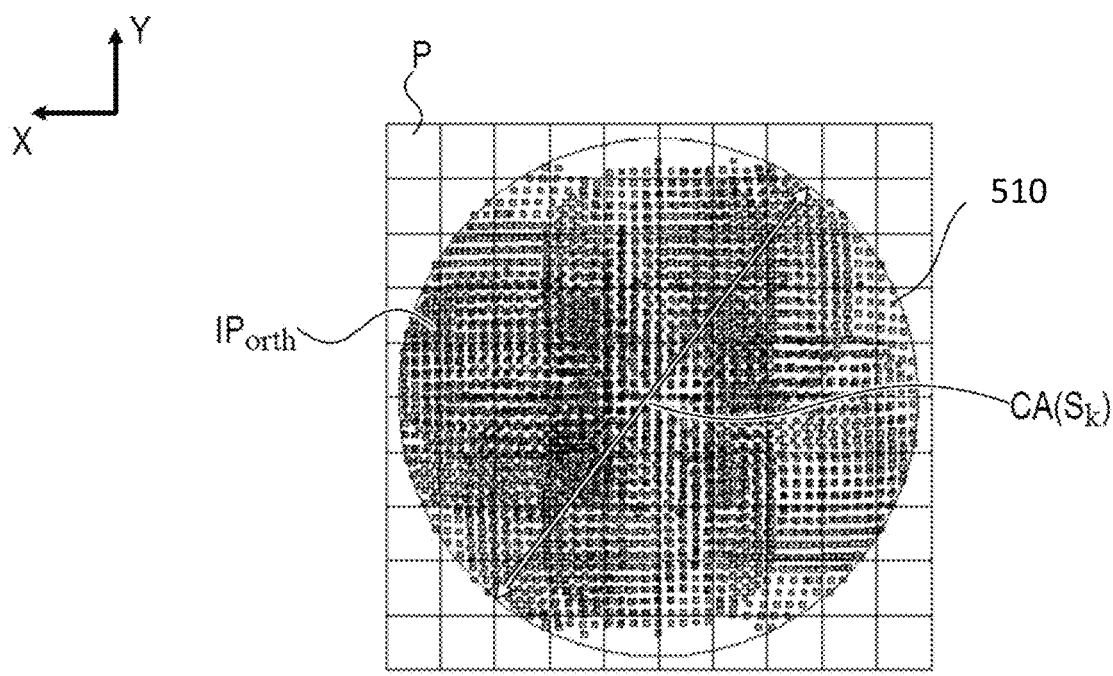
FIG. 5B provides a definition of clear aperture (CA)

As known and shown in FIG. 5B, a clear aperture $CA(S_k)$ is defined for each given surface $S_k$ (for $1 \leq k \leq 2N$) as the diameter of a circle, where the circle is the smallest possible circle located in a plane P orthogonal to the optical axis 402 and encircling all orthogonal projections $IP_{orth}$ of all impact points on plane P. As mentioned above with respect to $CH(S_k)$, the definition of $CA(S_k)$ also does not depend on the object currently imaged.

As shown in FIG. 5B, the circumscribed orthogonal projection $IP_{orth}$ of all impact points IP on plane P is a circle 510. The diameter of circle 510 defines $CA(S_k)$.

FIG. 7 shows a lens barrel 700 that includes a plurality of cut lens elements and a lens housing 704. A first cut lens element L1 702 is visible. L1 has a width along the x-axis ("$WL_X$") which is larger than the width along the z-axis ("$WL_Z$"), i.e. $WL_X > WL_Z$. The x-axis, y-axis and the y-axis are oriented identical as in FIGS. 3A-B and 3D-E.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A camera, comprising:
    a lens including a plurality of N lens elements marked $L_i$ where $1 \leq i \leq N$ and an optical path folding element (OPFE), wherein a first lens element $L_1$ faces an object side and a last lens element $L_N$ faces an image side, wherein the lens is divided into two lens groups marked G1 and G2, wherein at least one of the plurality of lens elements is located at an object side of the OPFE and has an associated first optical axis, wherein at least one other of the plurality of lens elements is located at an image side of the OPFE and has an associated second optical axis, and wherein the lens has an effective focal length (EFL); and
    an image sensor,
    wherein the EFL can be varied continuously between a minimal $EFL_{MIN}$ and a maximum $EFL_{MAX}$ by independent movement of G1 and G2 along the second optical lens axis,
    wherein $EFL_{MAX}/EFL_{MIN}$ is equal to or larger than 1.5,
    wherein the image sensor is operative to be moved with respect to both G1 and G2 for optical image stabilization (OIS) and for focusing, and
    wherein the camera has an aperture diameter DA and is included in a camera module having a shoulder with a shoulder height SH, wherein the SH is measured in a direction of the first optical axis and is equal to 1.5 mm+a height chosen from a higher of: a height of the image sensor or a height of a highest of the plurality of lens elements located on the image-side of the OPFE, and wherein DA>SH.

2. A camera, comprising:
    a lens including a plurality of N lens elements marked $L_i$ where $1 \leq i \leq N$ and an optical path folding element (OPFE), wherein a first lens element $L_1$ faces an object side and a last lens element $L_N$ faces an image side, wherein the lens is divided into two lens groups marked G1 and G2, wherein at least one of the plurality of lens elements is located at an object side of the OPFE and has an associated first optical axis, wherein at least one other of the plurality of lens elements is located at an image side of the OPFE and has an associated second optical axis, and wherein the lens has an effective focal length (EFL); and
    an image sensor,
    wherein the EFL can be varied continuously between a minimal $EFL_{MIN}$ and a maximum $EFL_{MAX}$ by independent movement of G1 and G2 along the second optical lens axis,
    wherein $EFL_{MAX}/EFL_{MIN}$ is equal to or larger than 1.5, and wherein the image sensor is operative to be moved with respect to both G1 and G2 for optical image stabilization (OIS) and for focusing, wherein G1 includes three lens element sub-groups G1-1, G1-2, G1-3 and the OPFE, wherein G1-1 is located on the object side of the OPFE and wherein G1-2 and G1-3 are located on the image side of the OPFE.

3. The camera of claim 1, wherein G2 includes lens element sub-groups G2-1 and G2-2, wherein G2-1 is located on an image side of G1-2 and at an object side of G1-3, wherein G2-2 is located on an image side of G1-3.

4. The camera of claim 1, wherein the movement of the image sensor for OIS is performed in two directions, and wherein the two directions are perpendicular to a normal on the image sensor and perpendicular to each other.

5. A camera, comprising:
a lens including a plurality of N lens elements marked $L_i$ where $1 \leq i \leq N$ and an optical path folding element (OPFE), wherein a first lens element $L_1$ faces an object side and a last lens element $L_N$ faces an image side, wherein the lens is divided into two lens groups marked G1 and G2, wherein at least one of the plurality of lens elements is located at an object side of the OPFE and has an associated first optical axis, wherein at least one other of the plurality of lens elements is located at an image side of the OPFE and has an associated second optical axis, and wherein the lens has an effective focal length (EFL); and
an image sensor,
wherein the EFL can be varied continuously between a minimal $EFL_{MIN}$ and a maximum $EFL_{MAX}$ by independent movement of G1 and G2 along the second optical lens axis,
wherein $EFL_{MAX}/EFL_{MIN}$ is equal to or larger than 1.5,
wherein the image sensor is operative to be moved with respect to both G1 and G2 for optical image stabilization (OIS) and for focusing,
wherein the camera is included in a camera module having a shoulder with a shoulder height SH and a camera module height MH, wherein the SH is measured in a direction of the first optical axis and is equal to 1.5 mm+a height chosen from a higher of: a height of the image sensor or a height of a highest of the plurality of lens elements located on the image-side of the OPFE, wherein the SH is in the range 4 mm<SH<10 mm and the MH is in the range 6 mm<MH<12 mm, and wherein a ratio SH/MH<0.9.

6. The camera of claim 1, the camera having a f number f/#MIN at $EFL_{MIN}$ and a f number f/#MAX at $EFL_{MAX}$, and wherein a ratio $f/\#_{MAX}/f/\#MIN < EFL_{MAX}/EFL_{MIN}$.

7. The camera of claim 1, the camera having a f number f/#MIN at $EFL_{MIN}$ is and a f number f/#MAX at $EFL_{MAX}$, wherein f/#MIN<3 and f/#MAX<5.

8. The camera of claim 1, wherein the lens is a cut lens, and wherein all lens elements located at the image side of the OPFE are cut along an axis parallel to the second optical axis.

9. A camera, comprising:
a lens including a plurality of 9 lens elements marked $L_i$ where $1 \leq i \leq 9$ and an optical path folding element (OPFE), wherein a first lens element $L_1$ faces an object side and a last lens element $L_N$ faces an image side, wherein the lens is divided into two lens groups marked G1 and G2, wherein at least one of the plurality of lens elements is located at an object side of the OPFE and has an associated first optical axis, wherein at least one other of the plurality of lens elements is located at an image side of the OPFE and has an associated second optical axis, and wherein the lens has an effective focal length (EFL); and
an image sensor,
wherein the EFL can be varied continuously between a minimal $EFL_{MIN}$ and a maximum $EFL_{MAX}$ by independent movement of G1 and G2 along the second optical lens axis,
wherein $EFL_{MAX}/EFL_{MIN}$ is equal to or larger than 1.5, and
wherein the image sensor is operative to be moved with respect to both G1 and G2 for optical image stabilization (OIS) and for focusing.

10. The camera of claim 9, wherein a power sequence of lens elements $L_1$-$L_9$ is plus-minus-minus-plus-minus-plus-minus-minus-plus.

11. The camera of claim 1, wherein $L_2$ is the first lens element located at the image side of the OPFE, wherein a distance between the OPFE and $L_2$ is marked $d_{M-L}$, and wherein $d_{M-L}$ does not change for the continuous variation of EFL.

12. The camera of claim 1, wherein the OPFE is a mirror.

13. The camera of claim 1, wherein 30 mm<$EFL_{MAX}$<50 mm and wherein 10 mm<$EFL_{MIN}$<30 mm.

14. The camera of claim 1, wherein the image sensor has a sensor diagonal SD and wherein SD is in the range 3 mm<SD<10 mm.

15. The camera of claim 1, wherein DA is in the range 5 mm<DA<11 mm and wherein f/# is in the range 1.8<f/#<6.0.

16. The camera of claim 1, wherein G1-1 includes $L_1$.

17. A mobile device including the camera of claim 1, wherein the mobile device has a device thickness T and a camera bump region, wherein the bump region has an elevated thickness T+B, wherein a first region of the camera is incorporated into the camera bump region and wherein a second region of the camera is not incorporated into the camera bump.

18. The mobile device of claim 17, wherein the mobile device in addition further includes a second camera with a second affective focal length $EFL_2$, and wherein $EFL_2 < EFL_{MIN}$.

19. The mobile device of claim 17, wherein the mobile device is a smartphone.

* * * * *